US008464685B2

(12) United States Patent
Mihailescu

(10) Patent No.: US 8,464,685 B2
(45) Date of Patent: Jun. 18, 2013

(54) HIGH PERFORMANCE CONTINUOUS INTERNAL COMBUSTION ENGINE

(75) Inventor: Ionel Mihailescu, Kenmare, ND (US)

(73) Assignee: Ionel Mihailescu, Kenmare, ND (US)

( * ) Notice: Subject to any disclaimer, the term of this patent is extended or adjusted under 35 U.S.C. 154(b) by 432 days.

(21) Appl. No.: 12/896,528

(22) Filed: Oct. 1, 2010

(65) Prior Publication Data

US 2011/0259295 A1 Oct. 27, 2011

Related U.S. Application Data

(60) Provisional application No. 61/343,048, filed on Apr. 23, 2010.

(51) Int. Cl.
*F02B 53/00* (2006.01)
(52) U.S. Cl.
CPC ...................................... *F02B 53/00* (2013.01)
USPC .......................................... 123/243; 123/236
(58) Field of Classification Search
USPC .................. 123/16, 200, 210, 211, 218, 222, 123/228, 229, 231, 239, 240, 242, 243; 418/61.2, 34, 269, 268, 266, 265, 264, 263, 418/260, 257, 241, 230, 228, 226, 223; 415/54
See application file for complete search history.

(56) References Cited

U.S. PATENT DOCUMENTS

| | | | | |
|---|---|---|---|---|
| 1,698,235 A | * | 1/1929 | Mathis | 418/258 |
| 1,776,452 A | * | 9/1930 | Rosenthal | 418/148 |
| 1,899,374 A | * | 2/1933 | Werle | 123/240 |
| 2,027,972 A | * | 1/1936 | Haller et al. | 418/263 |
| 2,636,480 A | * | 4/1953 | Becker | 418/81 |
| 3,244,155 A | | 4/1966 | Laudet | |
| 3,294,454 A | * | 12/1966 | Foerster et al. | 406/102 |
| 3,358,653 A | * | 12/1967 | Grimm | 123/240 |
| 3,426,735 A | * | 2/1969 | Kelly | 123/243 |
| 3,515,103 A | * | 6/1970 | Kaszmann | 418/59 |

(Continued)

FOREIGN PATENT DOCUMENTS

JP 59082530 A 5/1984

OTHER PUBLICATIONS

Applicant: Mihailescu, Ionel. Notification of Transmittal of the International Search Report and the Written Opinion of the International Searching Authoirty, or the Declaration. International Application No. PCT/US2011/030520. International Filing Date: Mar. 30, 2011.

*Primary Examiner* — Kenneth Bomberg
*Assistant Examiner* — Jason T Newton
(74) *Attorney, Agent, or Firm* — Marsh Fischmann & Breyfogle LLP

(57) ABSTRACT

An internal combustion engine that includes a rotary head that has an expansion chamber and that includes intake and exhaust slots. A drum is disposed in close noncontacting proximity to the inner side of the rotary head. The drum and the rotary head are substantially rotationally symmetric about a common axis. Radially moveable plates respond to a mechanical control mechanism adapted to move each plate from a retracted position in which the plate is located entirely within the outer surface of the drum and an extended position in close proximity to an upper surface of the expansion chamber to substantially seal the expansion chamber. At least one of the plates is present between the intake slot and the exhaust slot such that the combustion gas within the expansion chamber exerts a force on the plate and the drum to produce rotational motion of the rotary head about the common axis.

27 Claims, 36 Drawing Sheets

U.S. PATENT DOCUMENTS

| | | | |
|---|---|---|---|
| 3,568,645 A * | 3/1971 | Grimm | 418/264 |
| 3,814,064 A * | 6/1974 | Hanes | 123/222 |
| 3,847,123 A * | 11/1974 | Vierling | 123/242 |
| 3,885,531 A | 5/1975 | Zollenkopf | |
| 3,955,540 A * | 5/1976 | Blanchard | 418/260 |
| 4,005,951 A * | 2/1977 | Swinkels | 418/61.1 |
| 4,958,995 A * | 9/1990 | Sakamaki et al. | 418/152 |
| 4,998,868 A * | 3/1991 | Sakamaki et al. | 418/257 |
| 5,087,183 A * | 2/1992 | Edwards | 418/265 |
| 5,415,141 A | 5/1995 | McCann | |
| 5,522,356 A * | 6/1996 | Palmer | 123/236 |
| 5,537,974 A * | 7/1996 | Palmer | 123/204 |
| 6,125,814 A * | 10/2000 | Tang | 123/222 |
| 6,615,793 B1 | 9/2003 | Usack | |
| 6,883,488 B2 * | 4/2005 | Viitamaki | 123/240 |
| 7,192,264 B2 * | 3/2007 | Viitamaki | 418/265 |
| 7,478,619 B2 | 1/2009 | Patrono | |
| 2006/0207546 A1 | 9/2006 | Bechtel | |
| 2006/0283419 A1 | 12/2006 | Mihailescu | |
| 2006/0283420 A1 * | 12/2006 | Mihailescu | 123/204 |
| 2008/0141974 A1 * | 6/2008 | Bechtel | 123/243 |
| 2009/0007882 A1 * | 1/2009 | Lents et al. | 123/200 |
| 2009/0223480 A1 | 9/2009 | Sleiman et al. | |
| 2010/0083933 A1 | 4/2010 | Varga | |
| 2011/0017169 A1 * | 1/2011 | Viitamaki et al. | 123/242 |
| 2011/0083637 A1 * | 4/2011 | Blount | 123/220 |

* cited by examiner

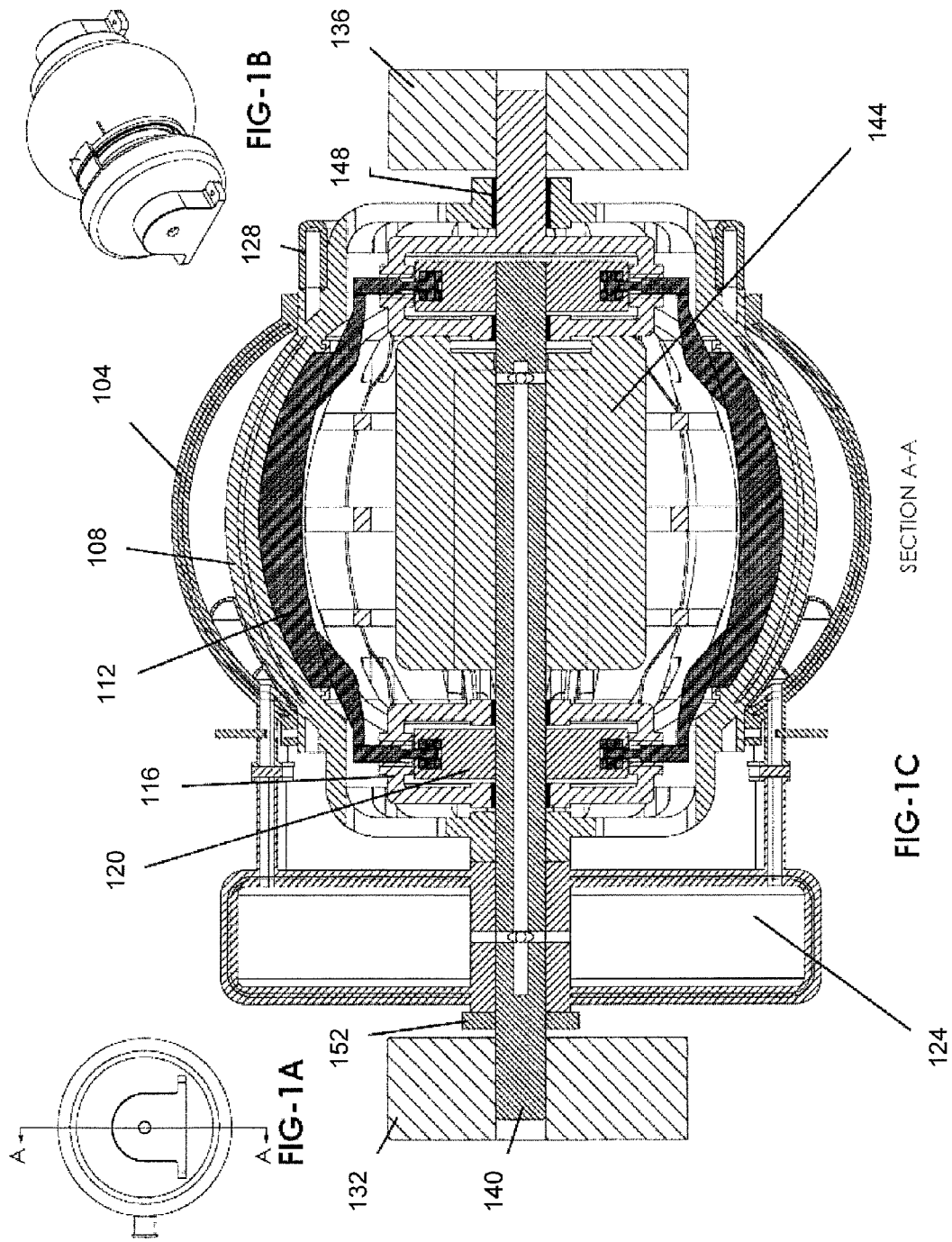

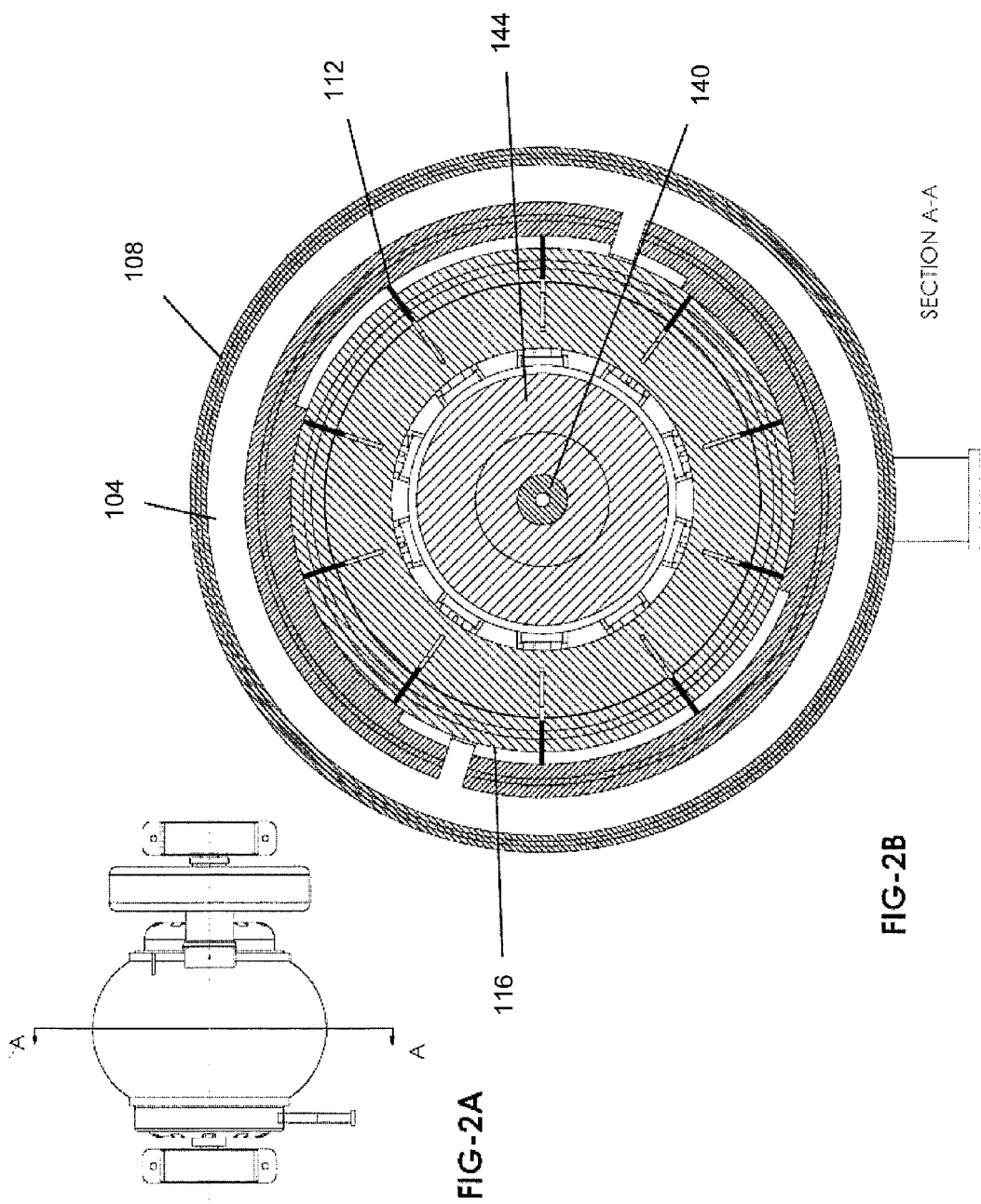

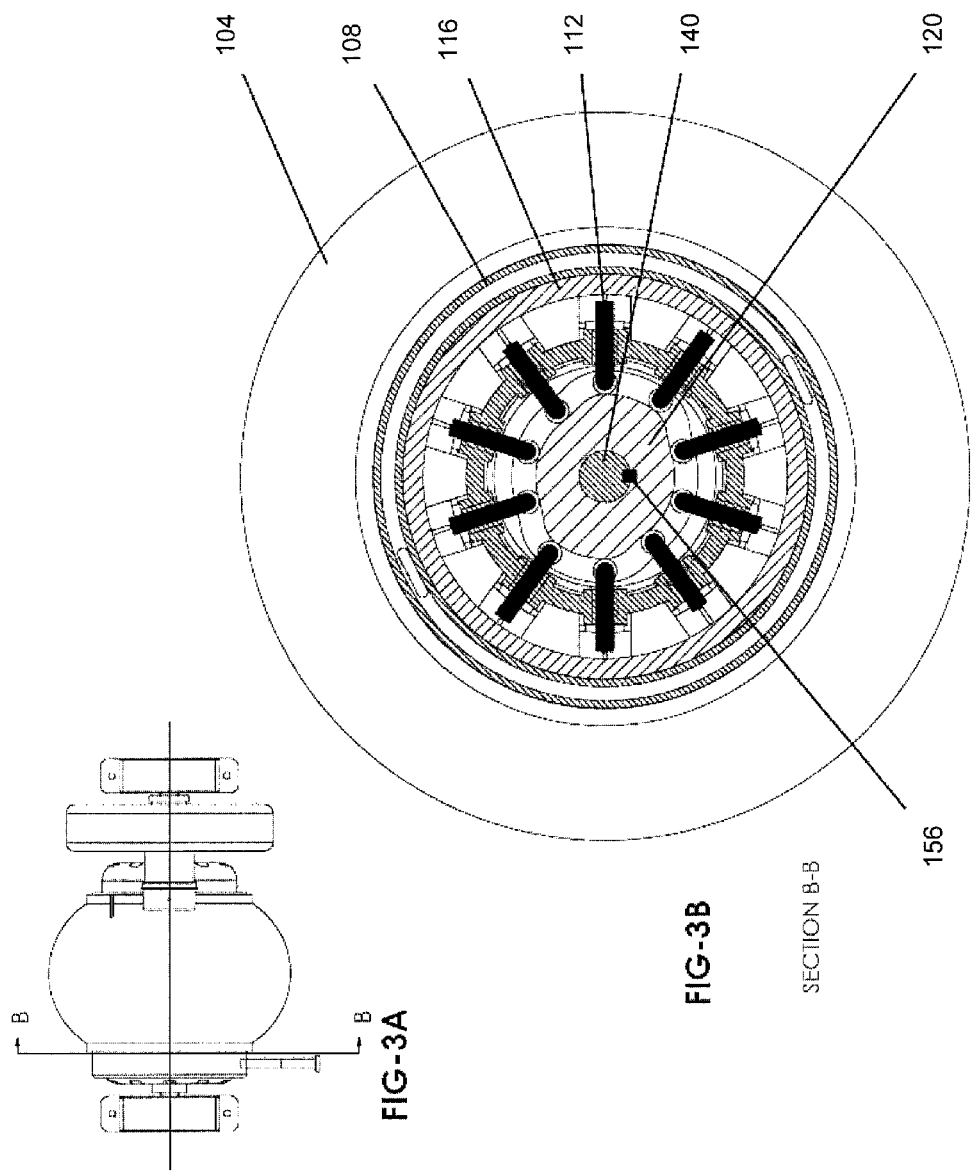

SECTION C-C

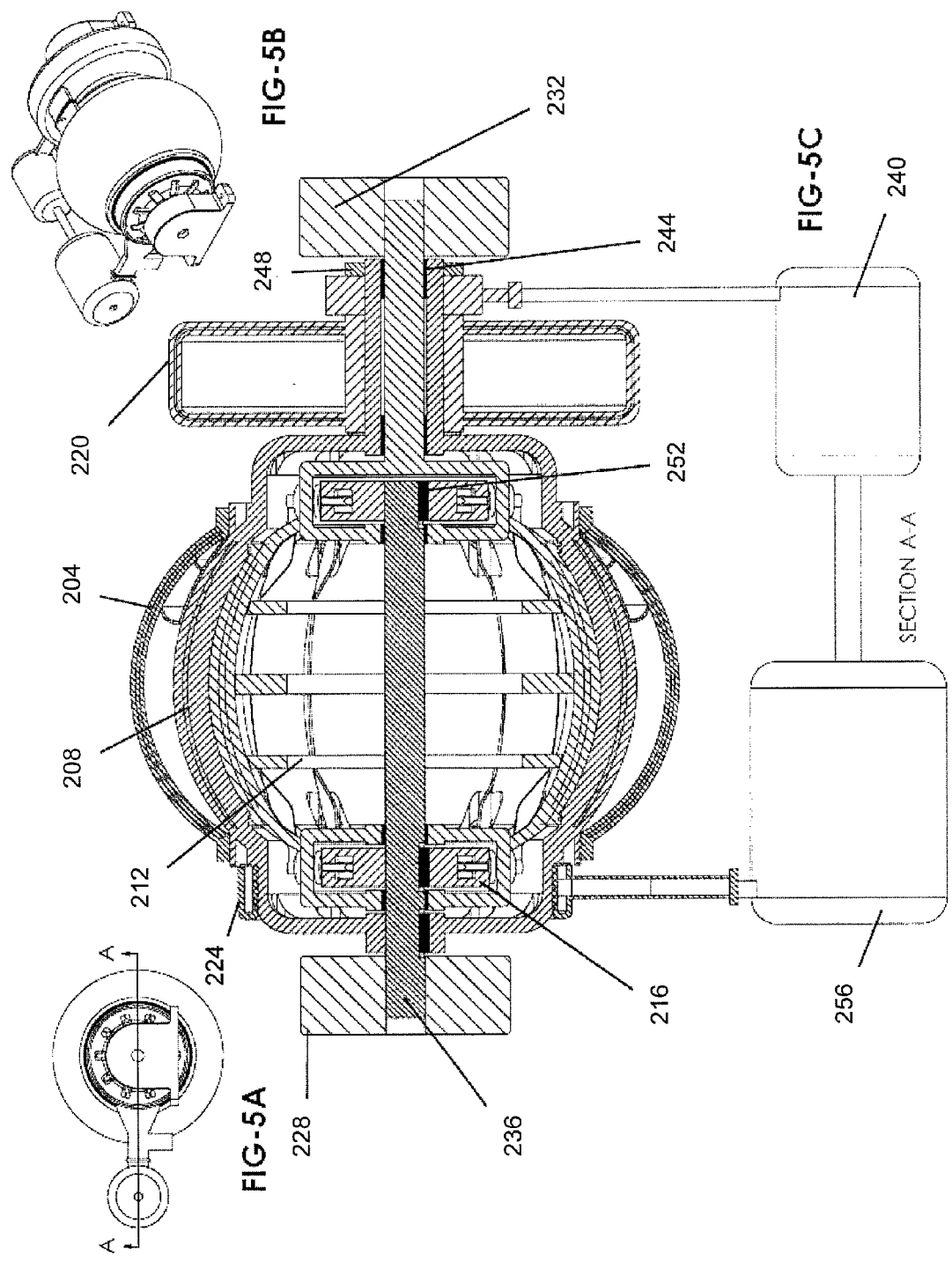

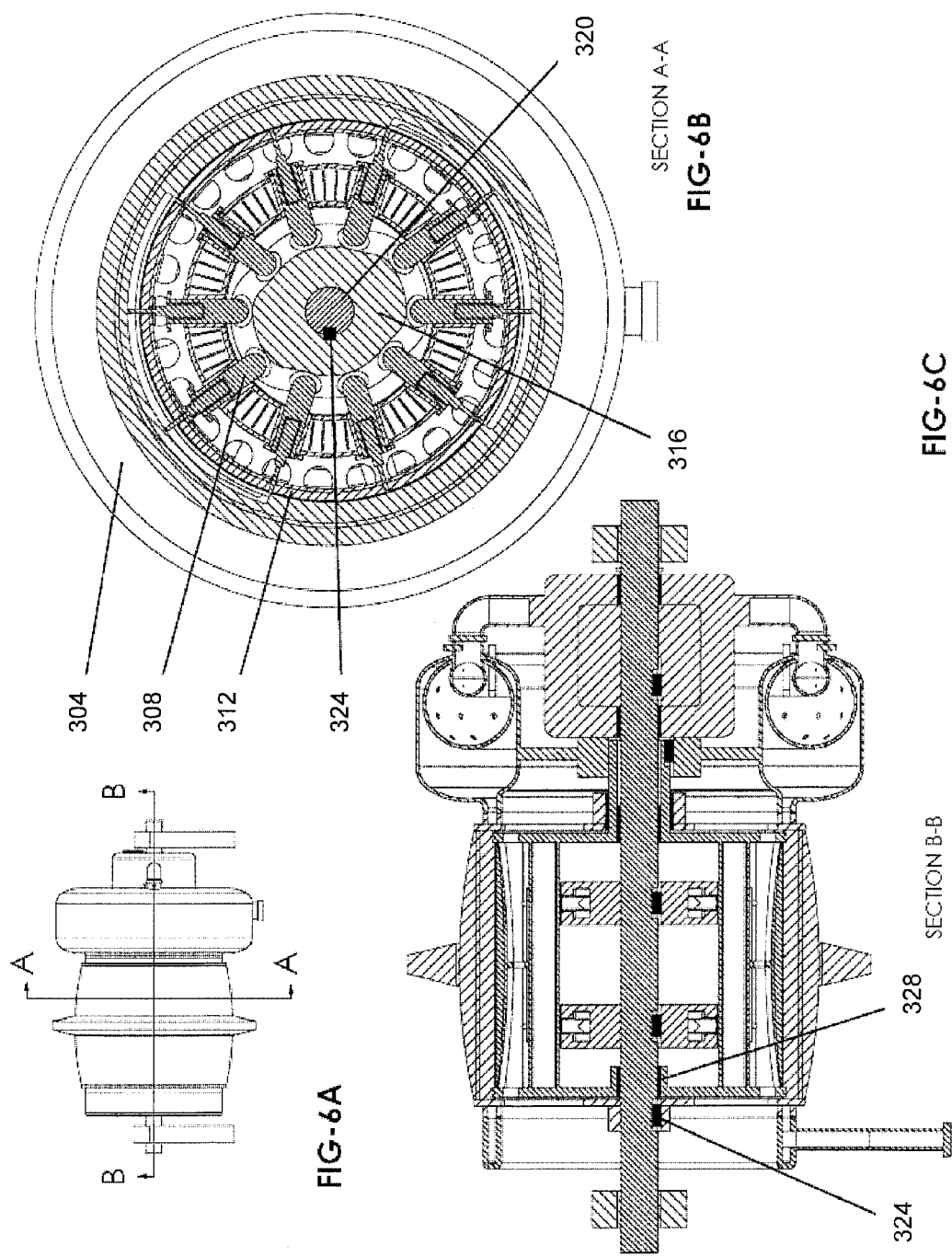

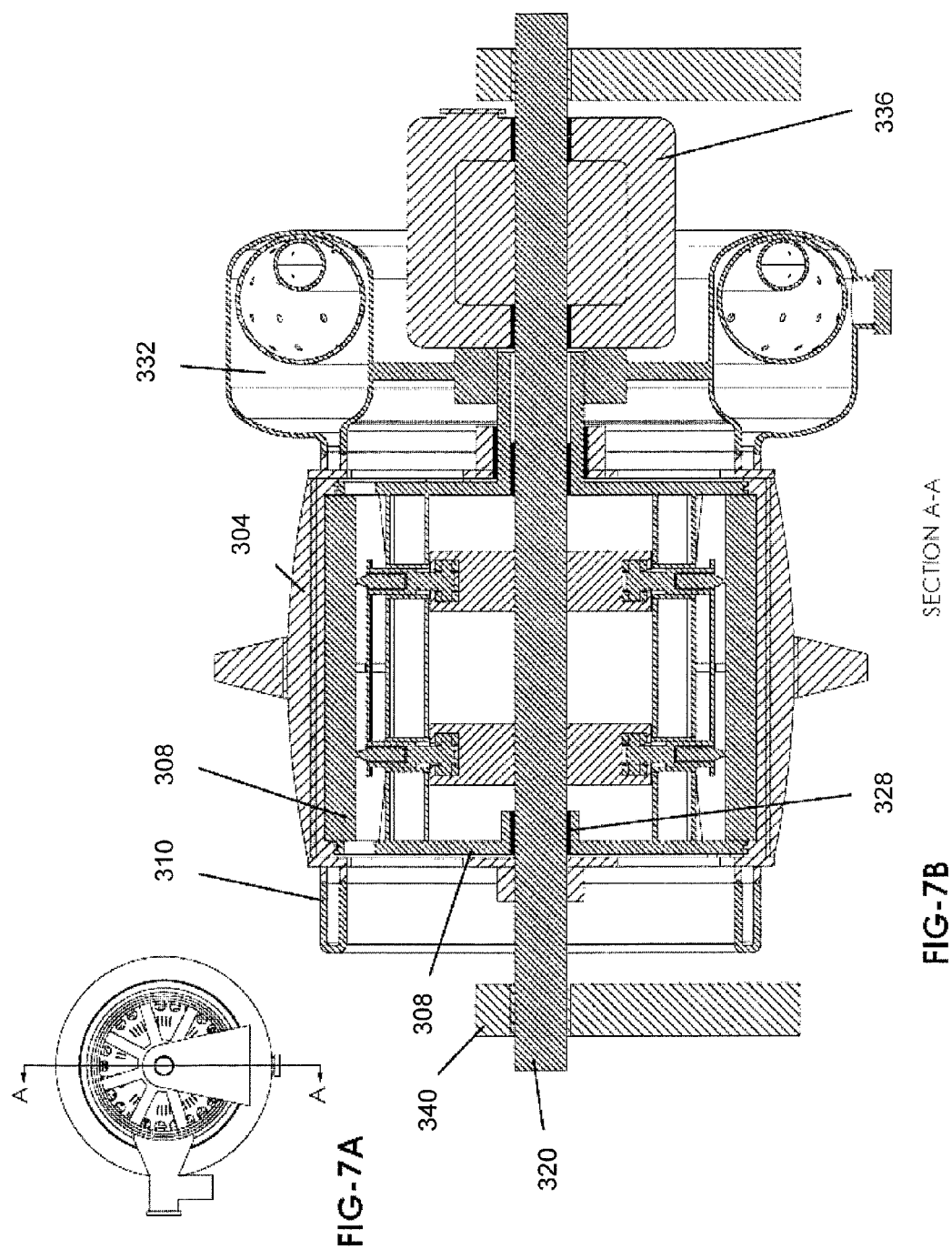

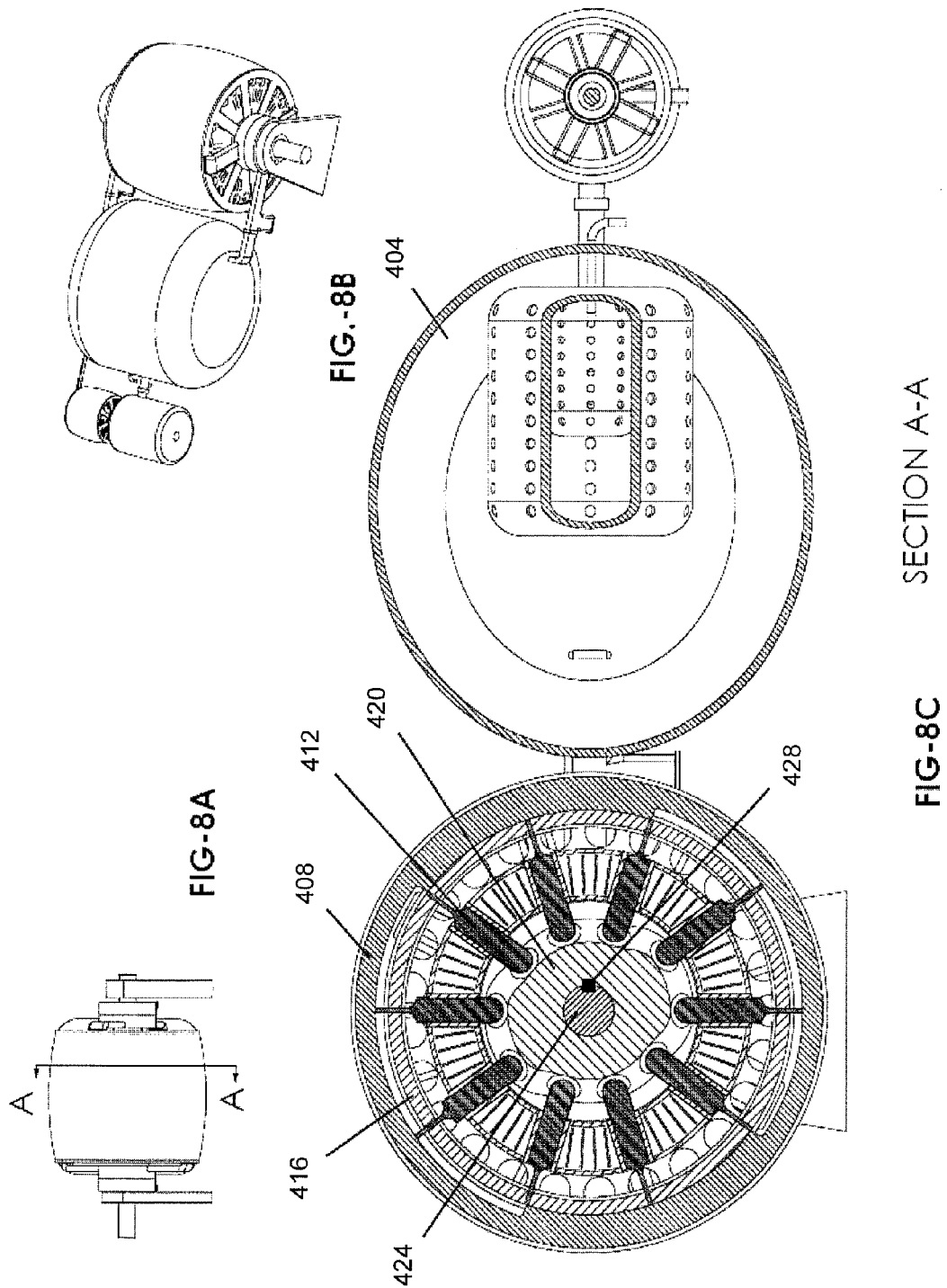

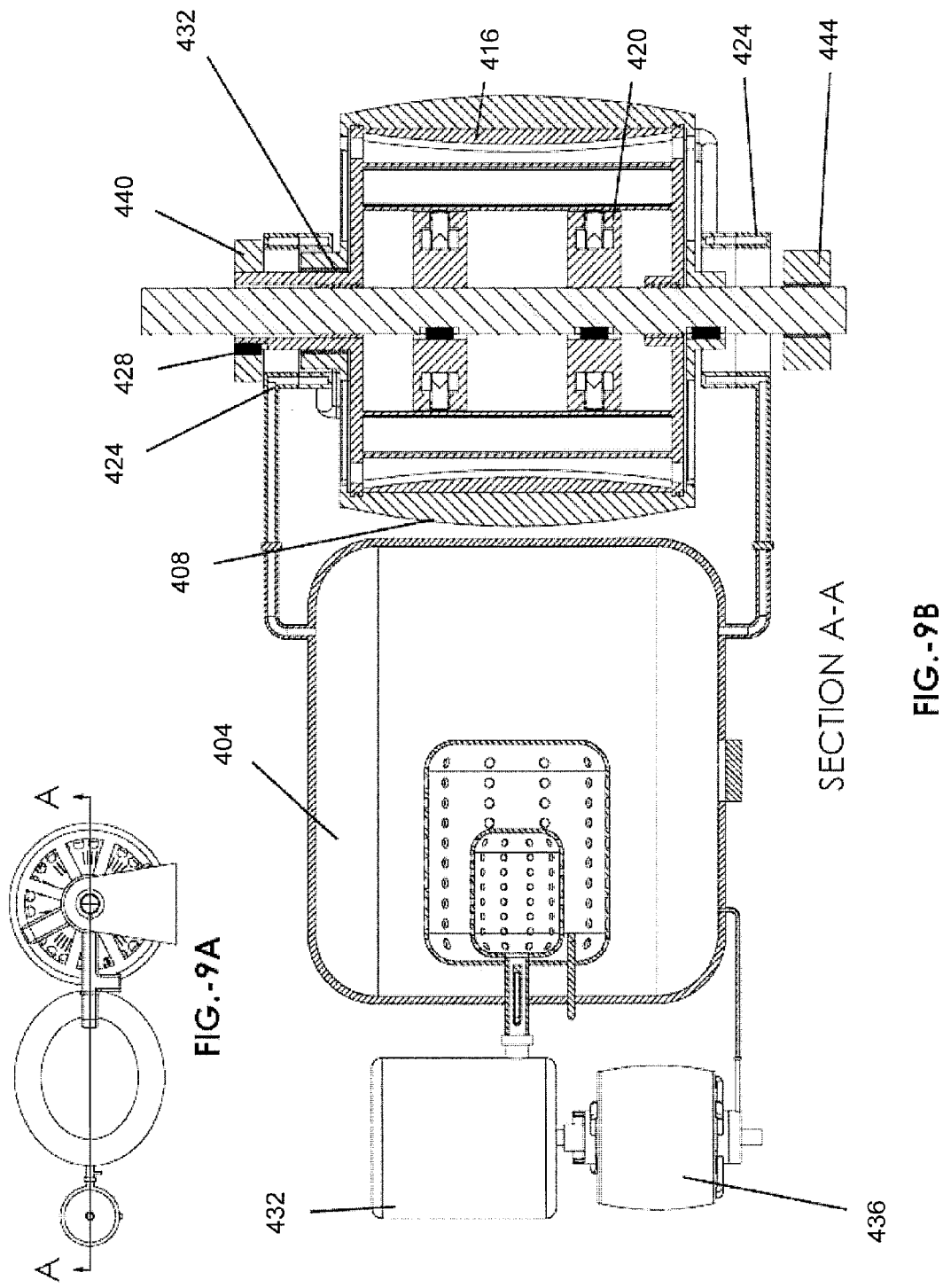

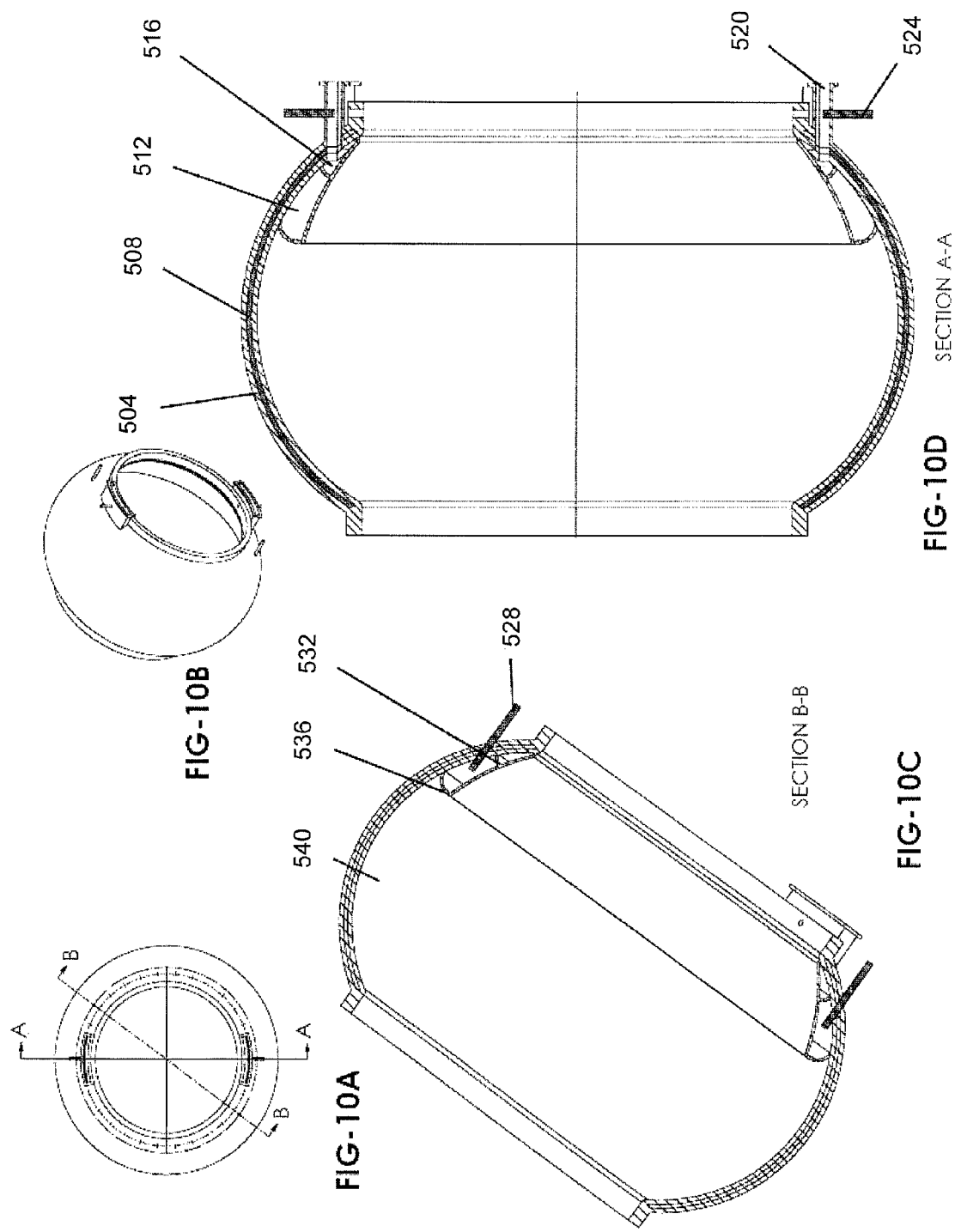

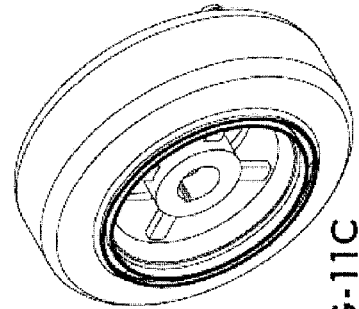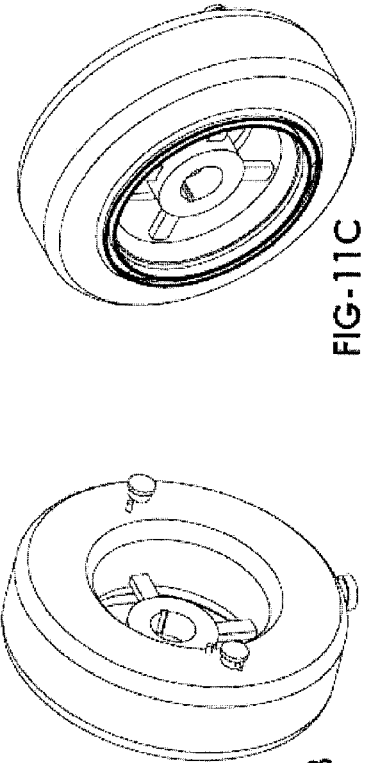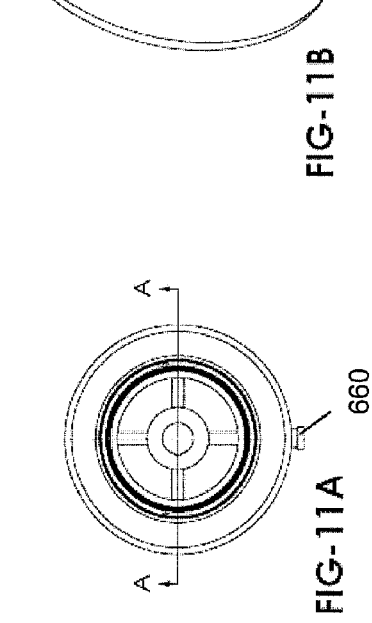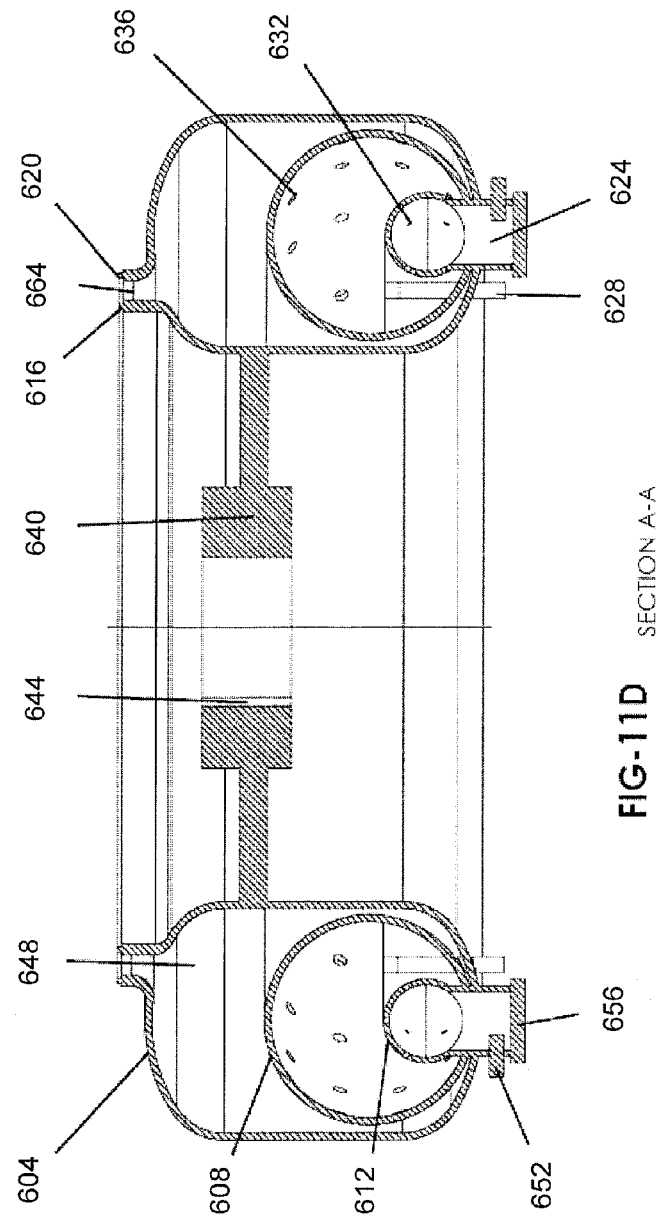

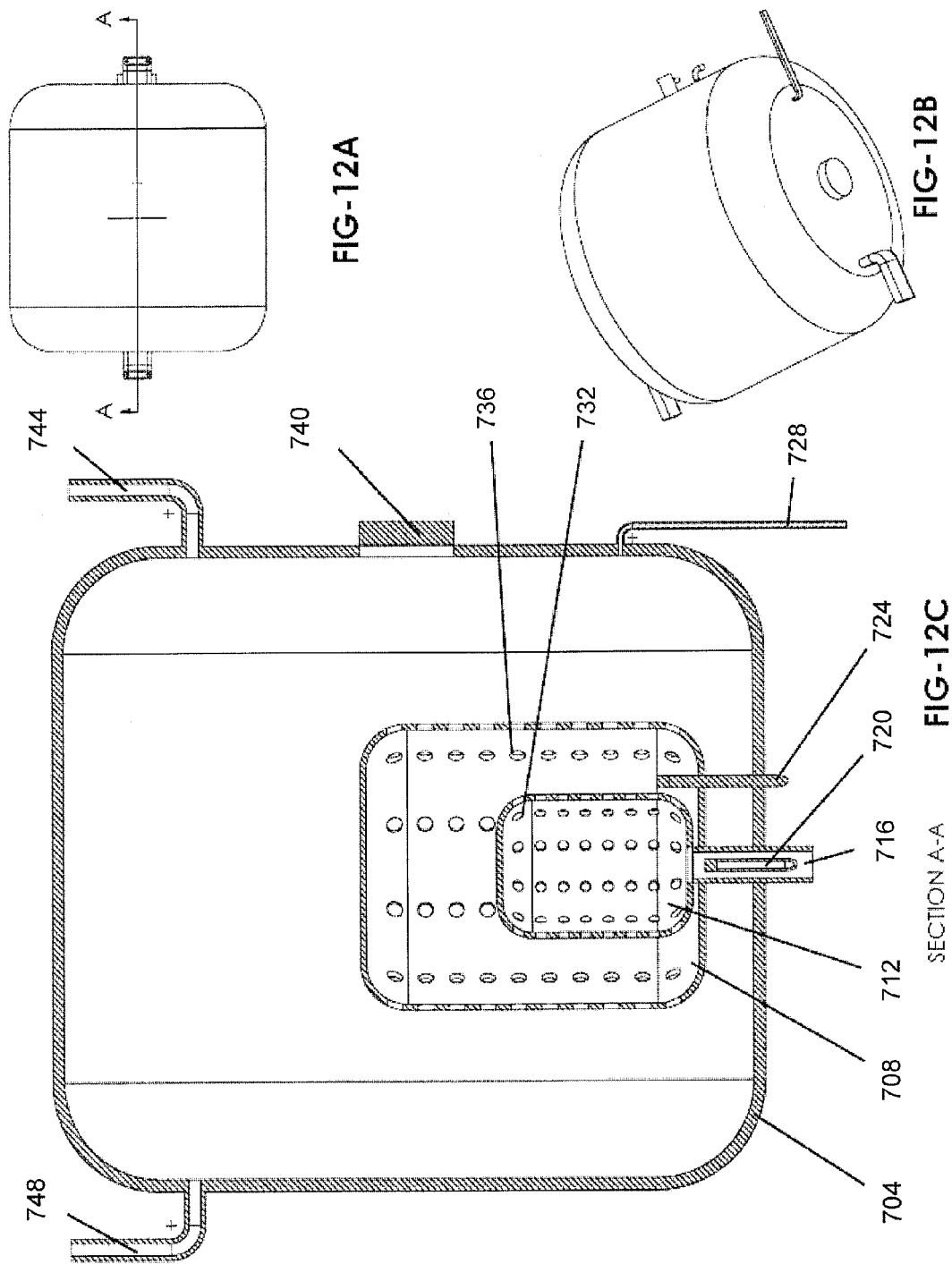

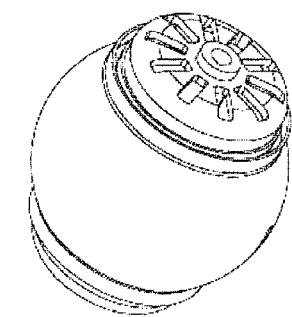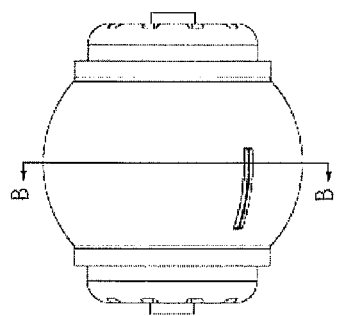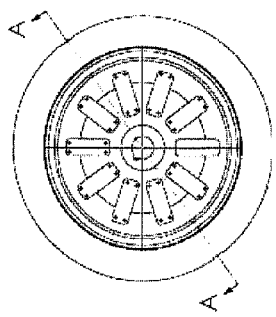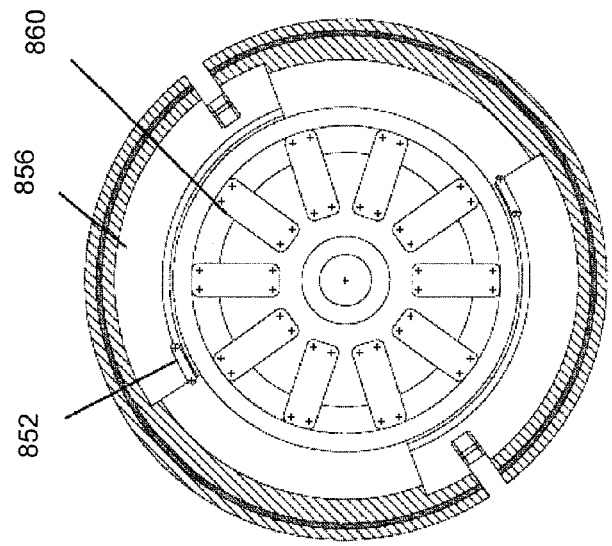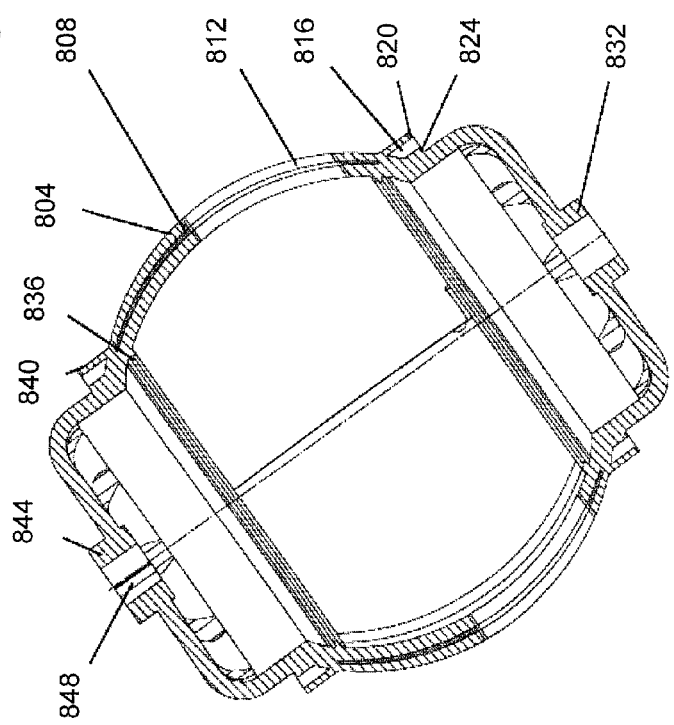

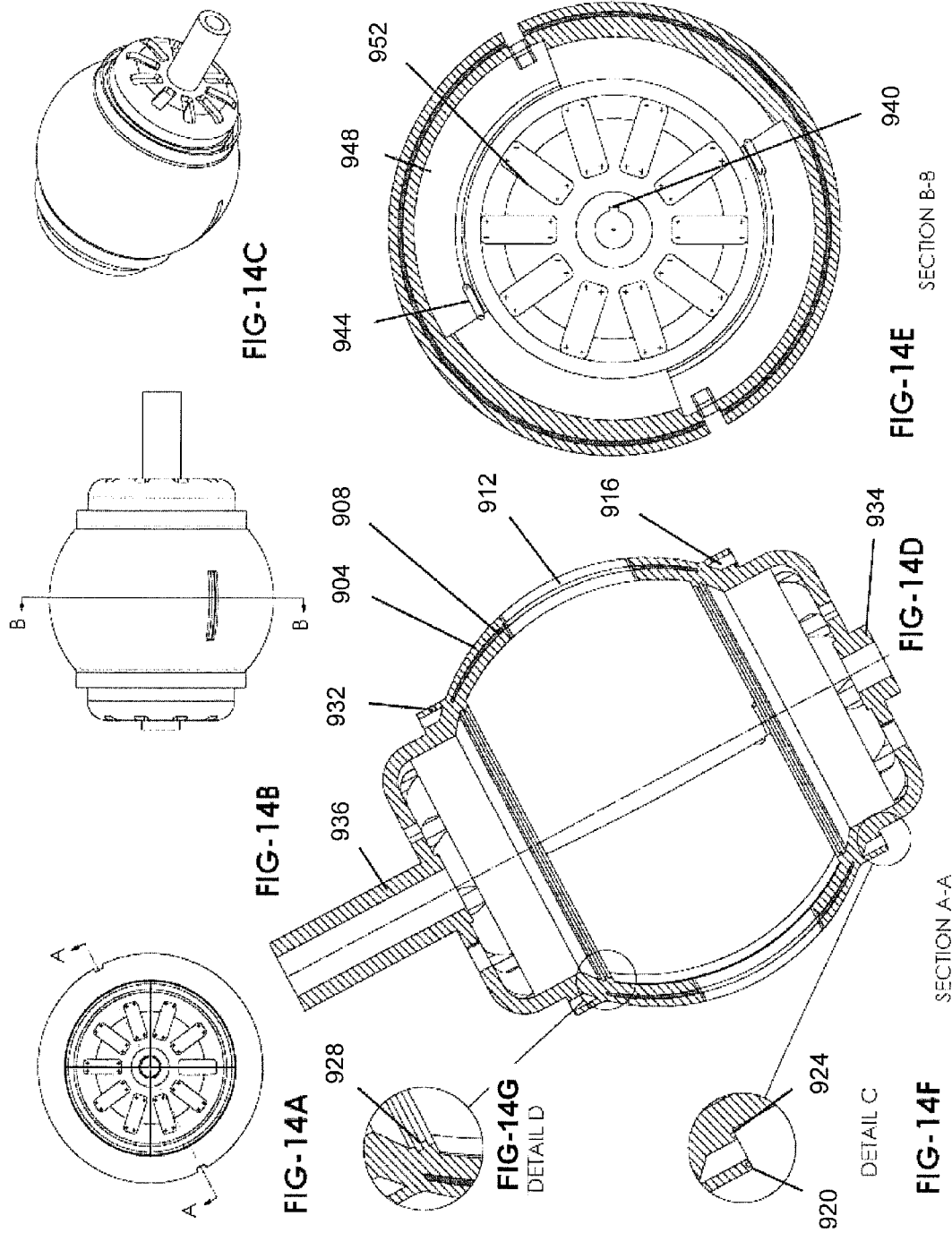

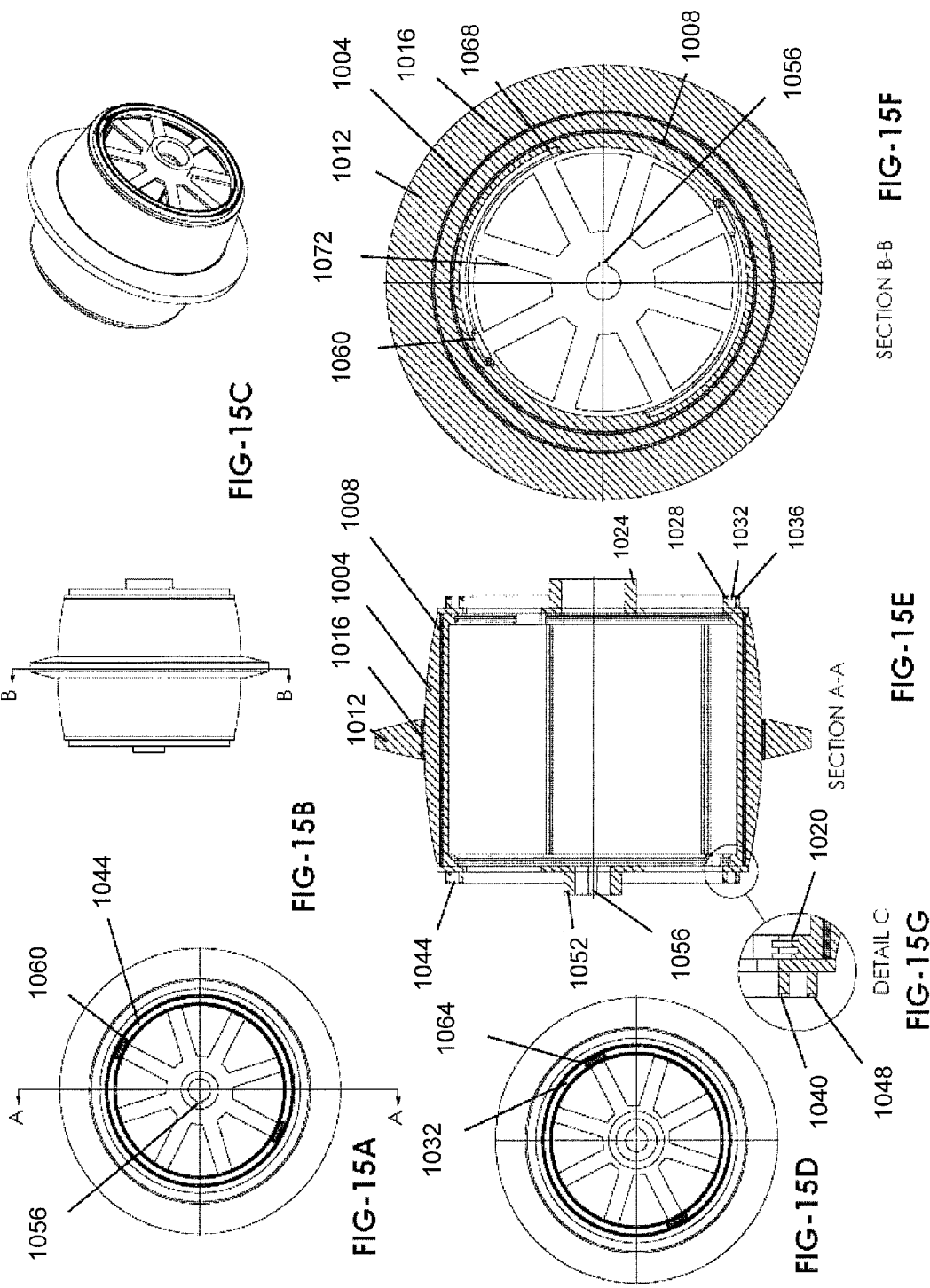

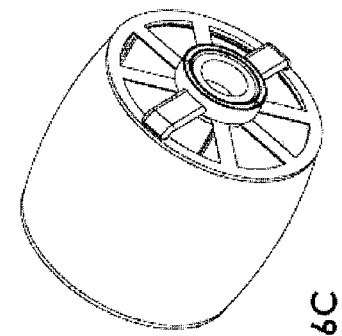
FIG-16C
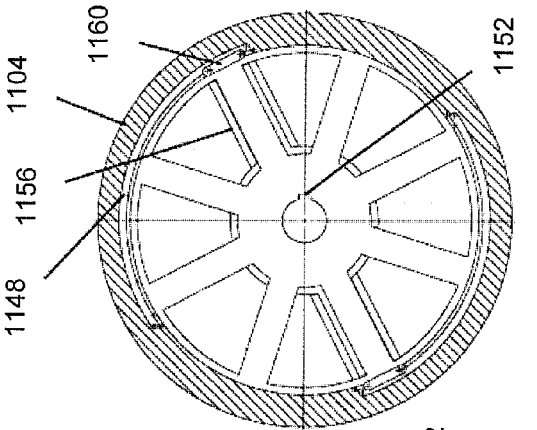
FIG-16F
SECTION B-B
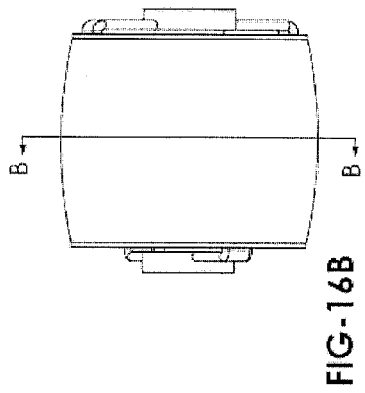
FIG-16B
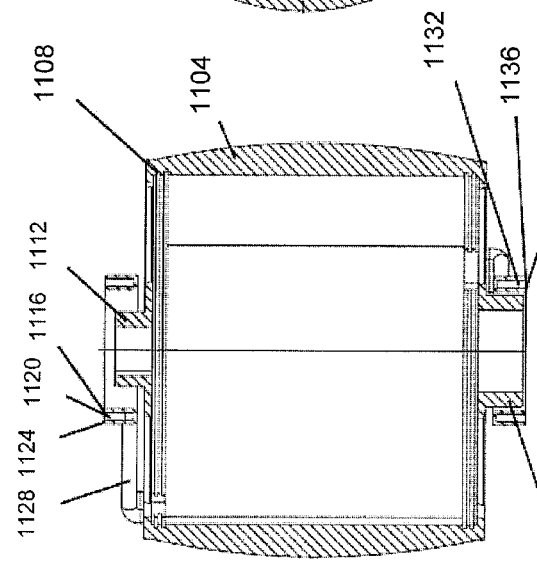
FIG-16E
SECTION A-A
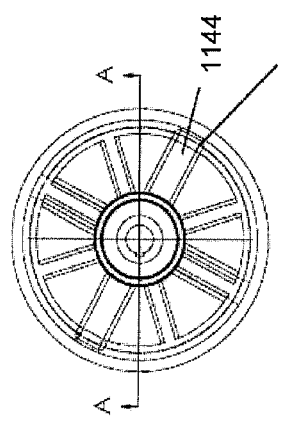
FIG-16A
FIG-16D

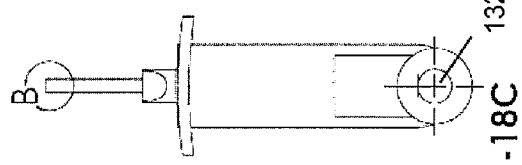
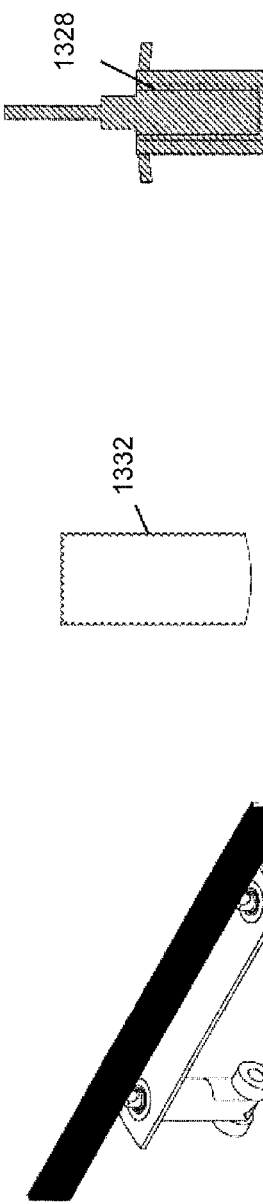
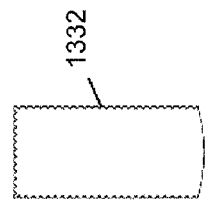
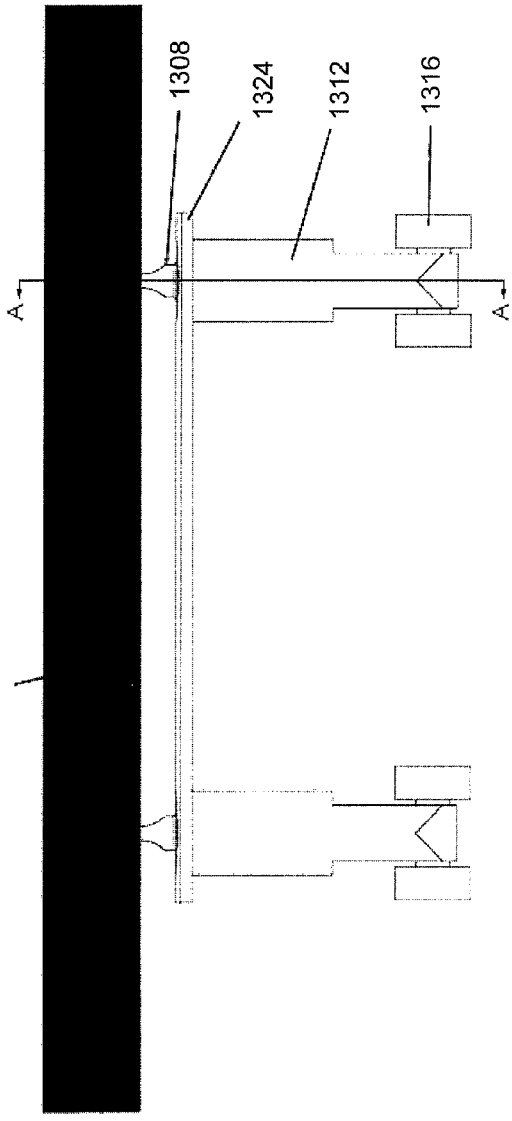
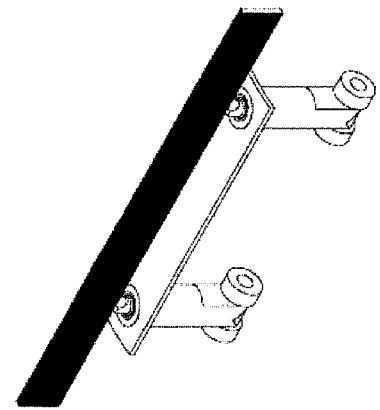
FIG-18A, FIG-18B, FIG-18C, FIG-18D, FIG-18E

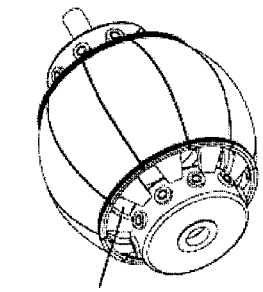
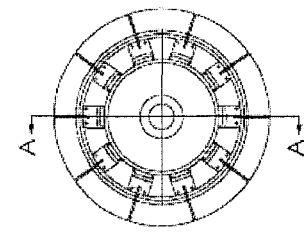
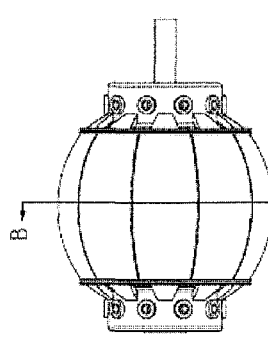
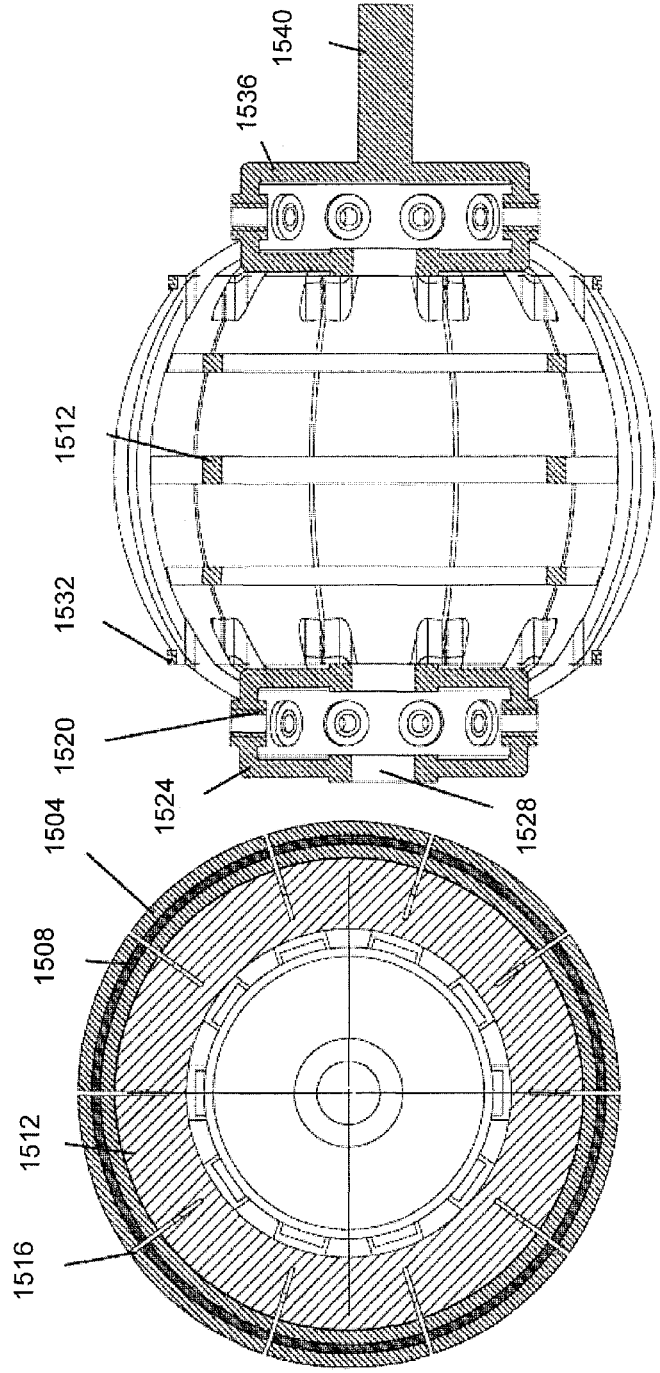

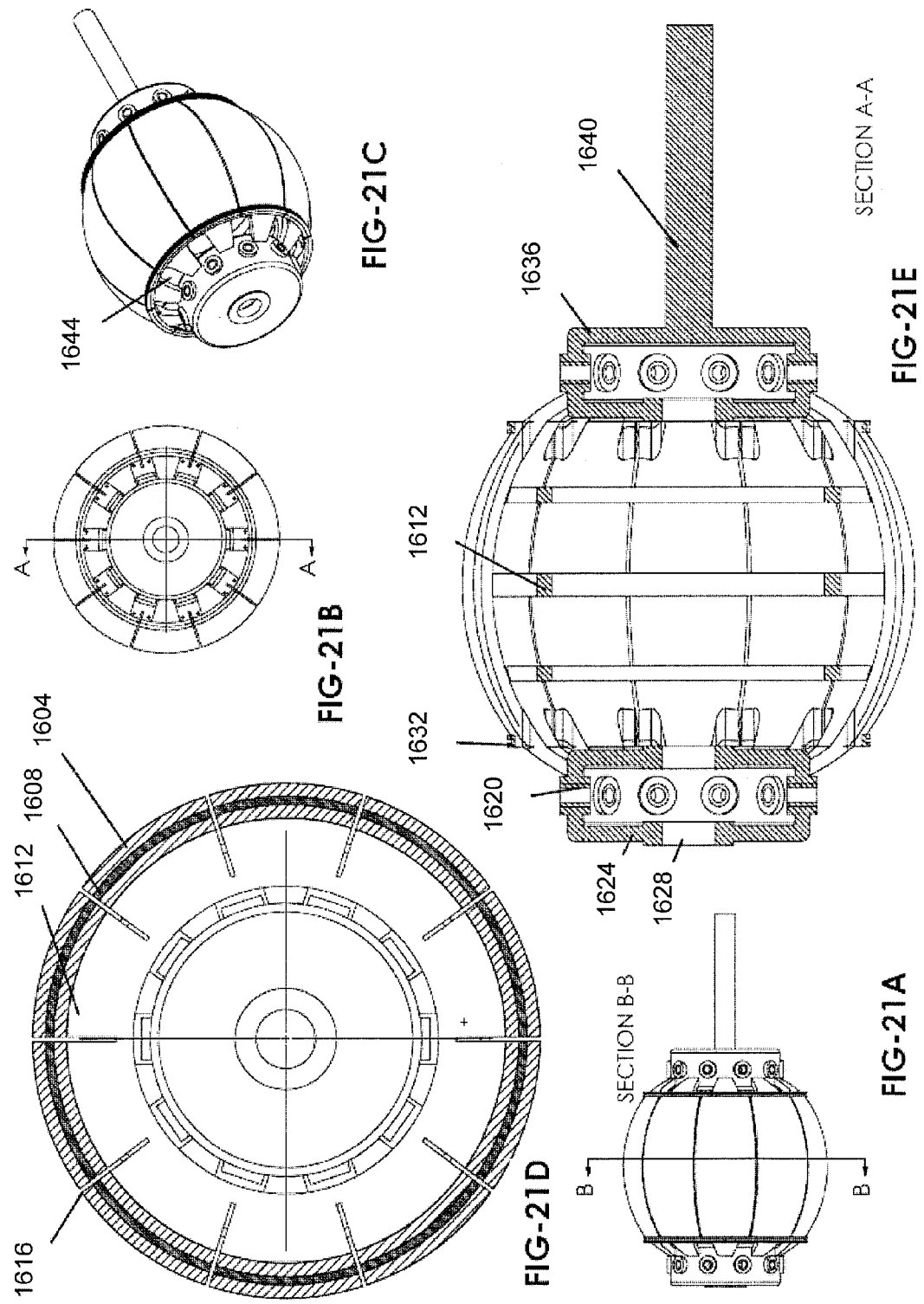

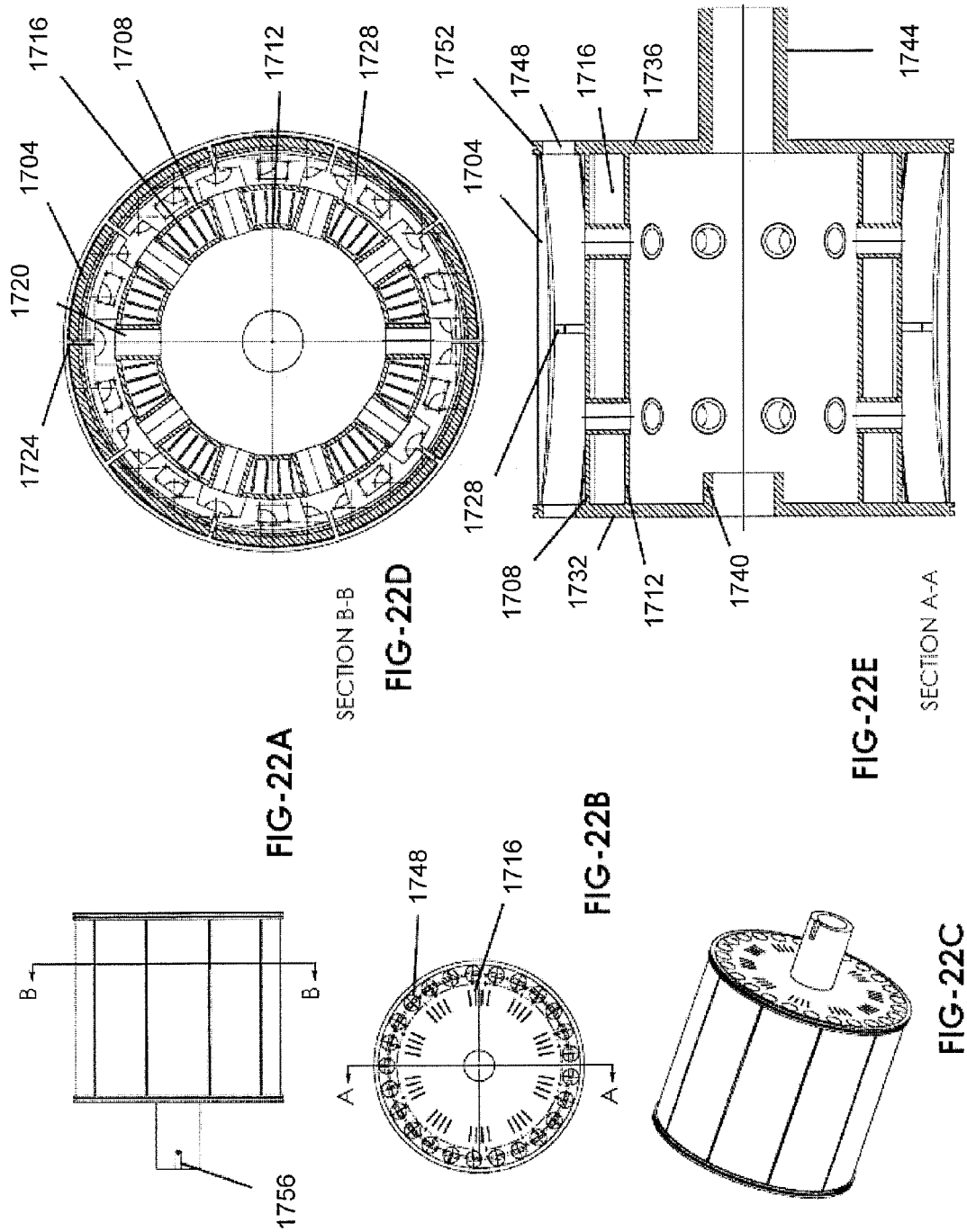

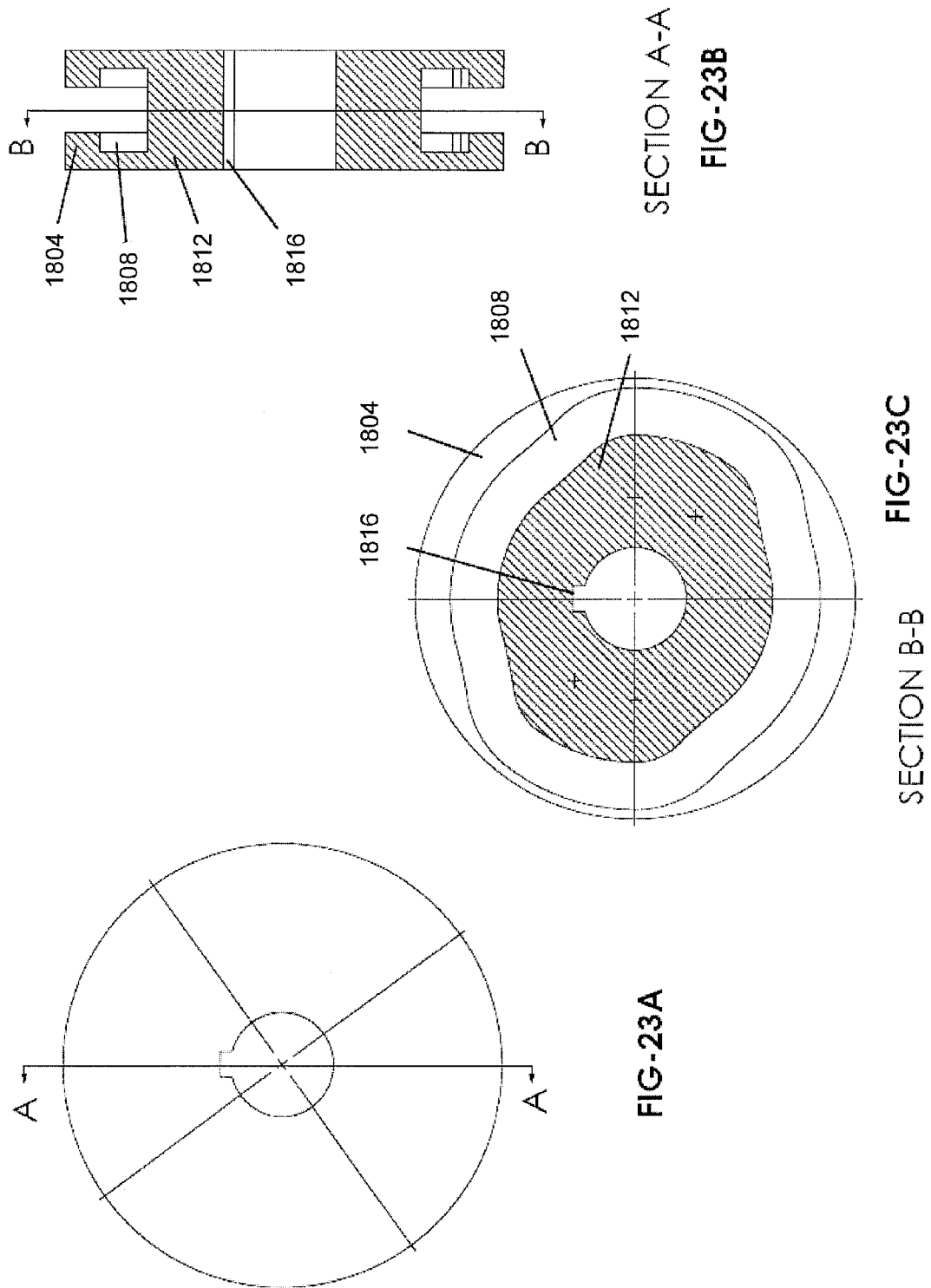

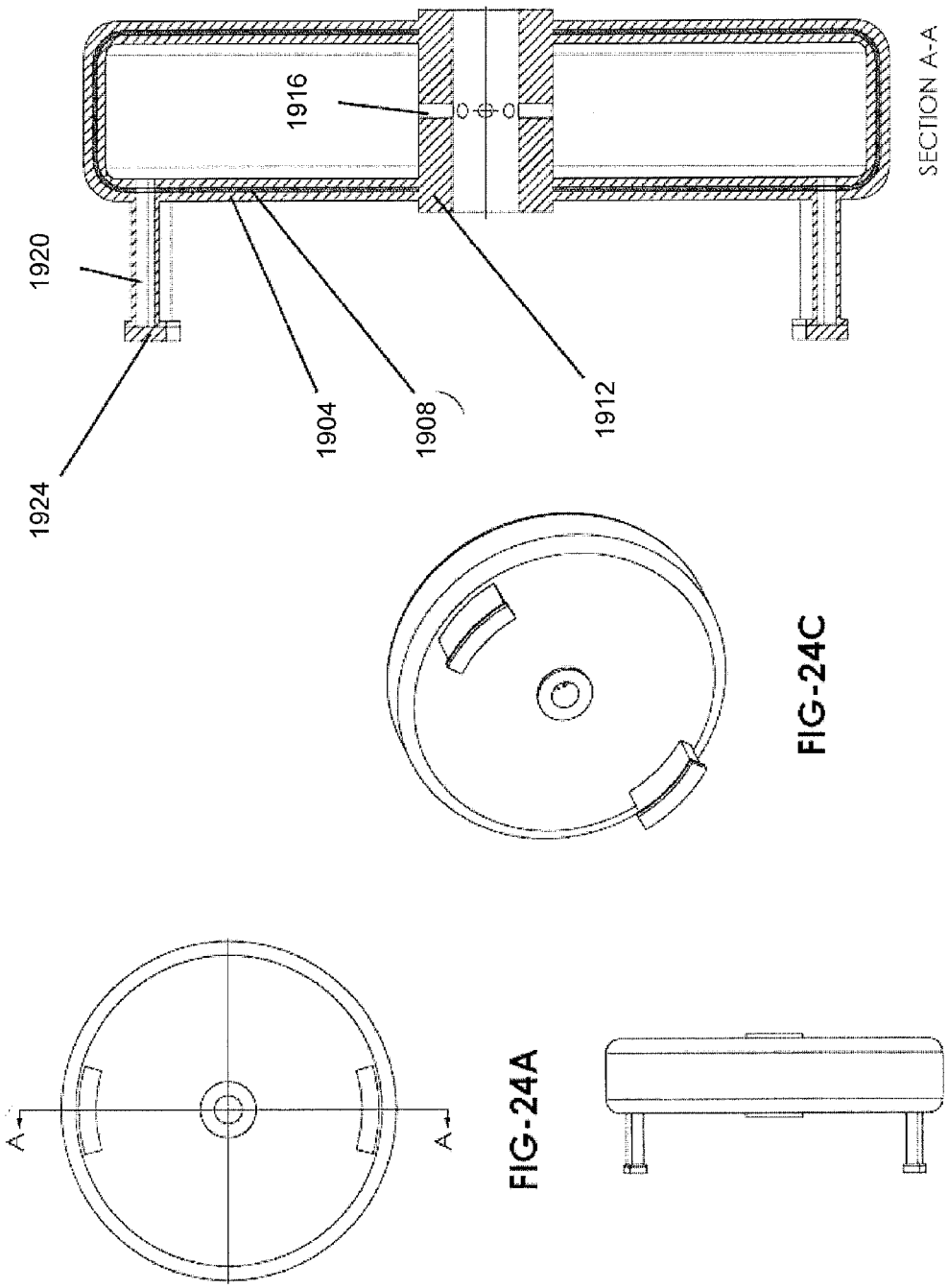

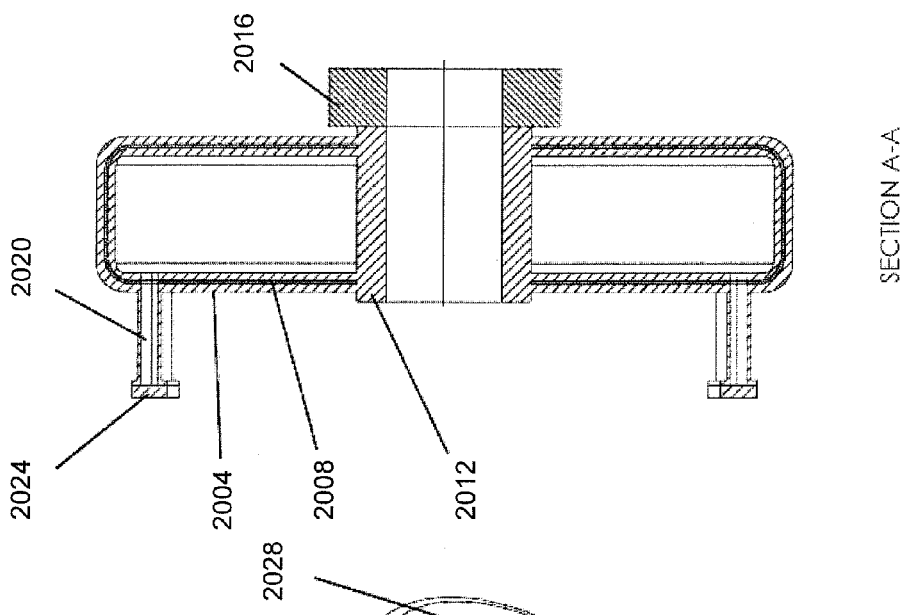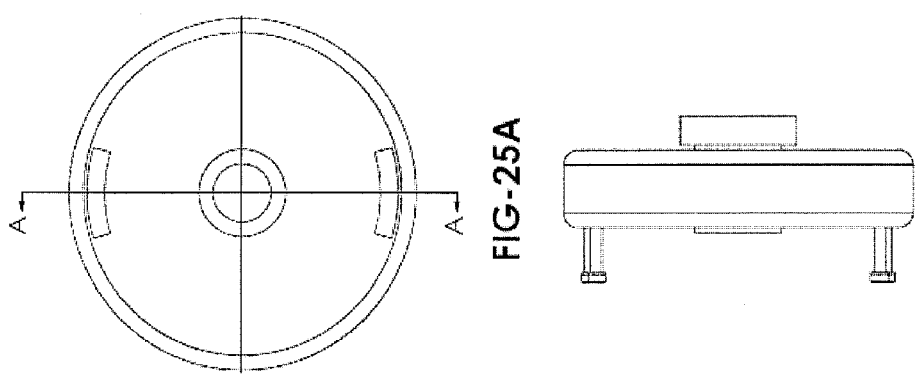

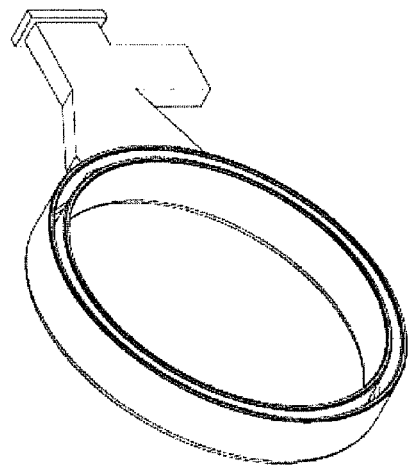
FIG-27B
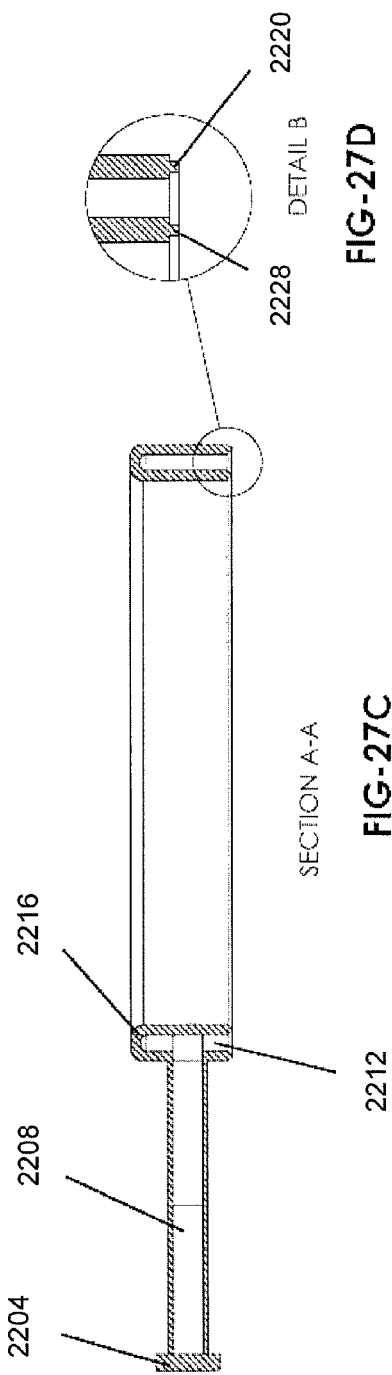
FIG-27D
FIG-27C
FIG-27A

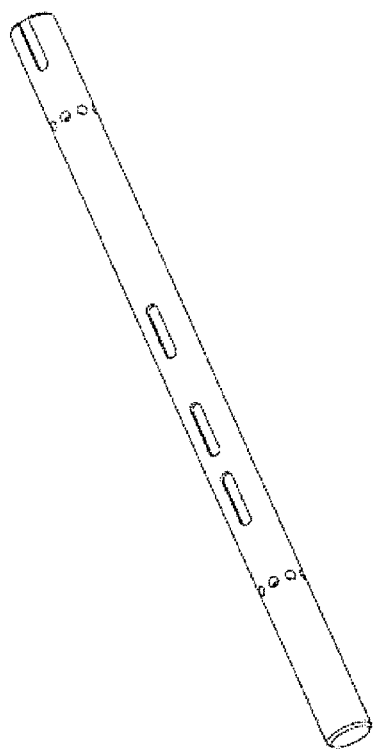
FIG-28A
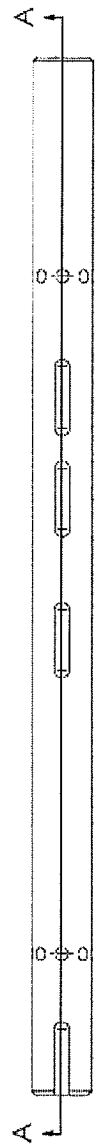
FIG-28B
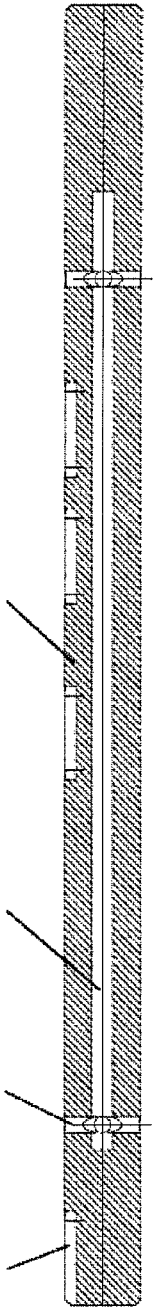
SECTION A-A  FIG-28C

SECTION A-A

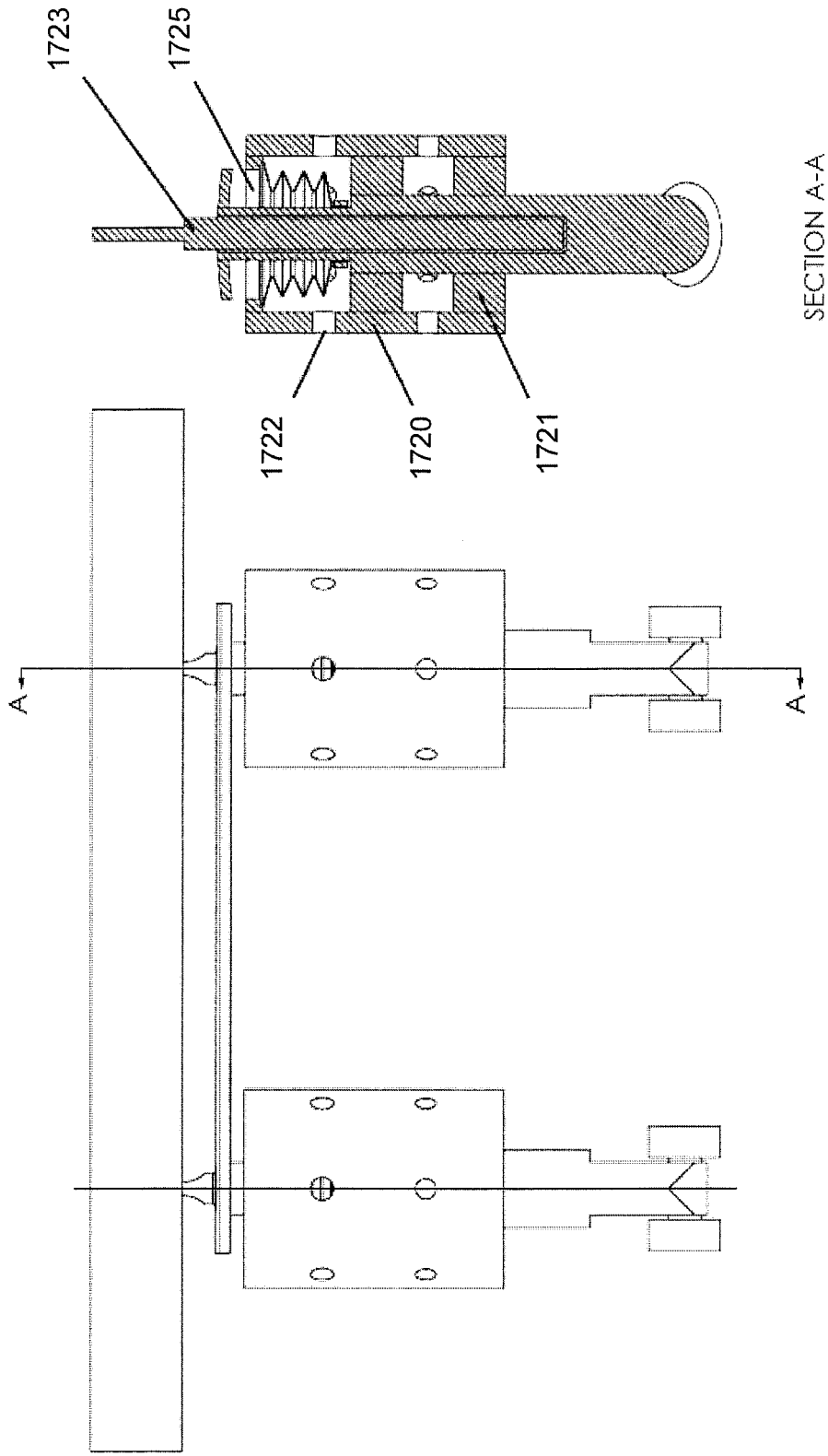

FIG-31B SECTION A-A

SECTION A-A 2404
2408
2412

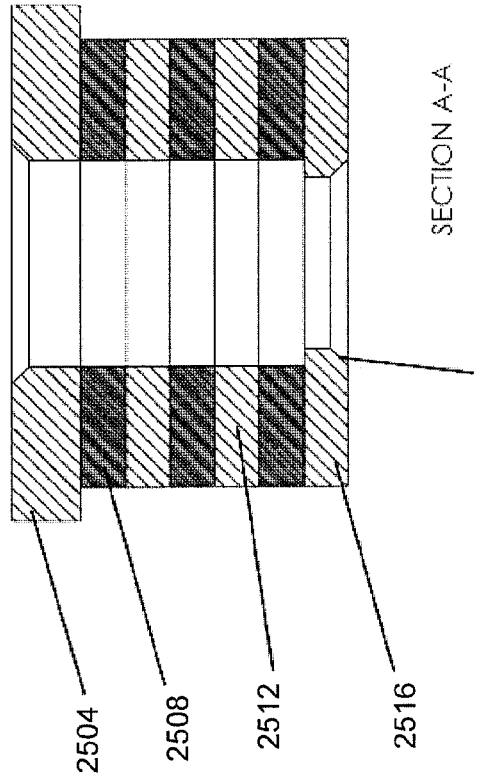
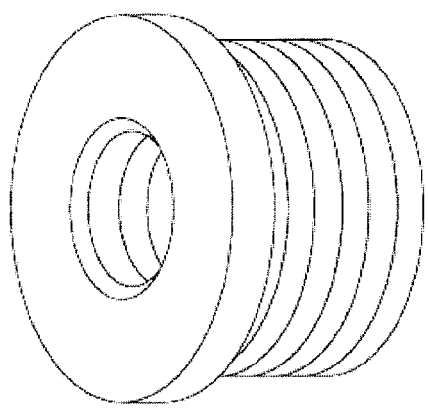
FIG-33A
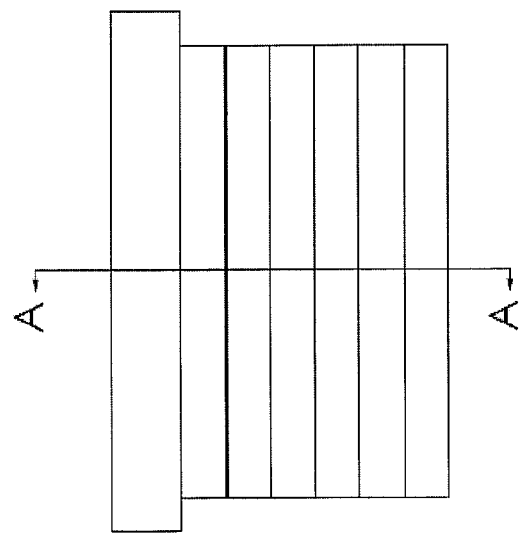
FIG-33B

HIGH PERFORMANCE CONTINUOUS INTERNAL COMBUSTION ENGINE

CROSS REFERENCE TO RELATED APPLICATION

This application is a nonprovisional of, and claims the benefit of the filing date of U.S. Prov. Pat. Appl. No. 61/343,048, entitled "High performance continuous internal combustion engine," filed Apr. 23, 2010 by Ionel Mihailescu, the entire disclosure of which is incorporated herein by reference for all purposes.

BACKGROUND OF THE INVENTION

This application relates generally to an internal combustion engine. More specifically, this application relates to a rotary internal combustion engine.

Internal combustion engines provide a mechanism for generating energy through the combustion of a fuel with an oxidizer, with typical fuels including diesel, gasoline, petroleum gas, and propane, and typical oxidizers including air. A number of different designs for internal combustion engines are known, including reciprocating engines in which pistons move within cylinders to convert pressure into rotational motion. Examples of reciprocating engines particularly include stroke engines, with designs that implement two-stroke cycles, four-stroke cycles, and six-stroke cycles, although there are other designs also.

Other structures for internal combustion engines avoid the use of pistons, such as by using rotors to effect the conversion of pressure into rotational motion instead of reciprocating pistons.

Both reciprocating engines and rotary engines are examples of engines that operate with intermittent combustion. Other designs use the same general principle of converting pressure into rotational motion, but are configured so that the combustion is continuous.

There are a number of sources of inefficiency in various engine designs, and some designs are more susceptible to operational failures. For example, in some rotary designs, contact between the rotary vanes and stationary parts of the engine reduces the lifetime of the engine because of progressive damage arising from friction. Other designs have constant-volume combustion chambers, limiting the ability for combustion gases to expand under pressure. In most such engines, the gases under pressure have little leverage when acting on the rotary part so that the efficiency can be low.

Some engines that function as conventional two- or four-stroke engines provide insufficient time for complete fuel burning or lack ways to cool, resulting in limited efficiency. Other disadvantages that are known with convention two- or four-stroke engines include variations in leverage, with relatively little leverage being provided at the beginning of the power stroke so that power may be lost at the end of the power stroke. In addition, the exhaust valve is typically opened when the cylinders are still under pressure, contributing to power loss, particularly at high revolution speeds. These types of engines tend to have a large number of moving parts, which can be heavy so that energy is lost in accelerating those parts. There may also be significant losses due to friction between the moving parts.

SUMMARY

Embodiments of the invention provide a rotary device and an internal combustion engine that may include the rotary device.

The rotary device comprises a rotary head having an expansion chamber on an inner side of a body of the rotary head. The expansion chamber includes an intake slot in fluid communication with a source of combustion gas and includes an exhaust slot.

A drum has a plurality of axial slots radially displaced over a circumference of the drum. An outer surface of the drum is disposed in close noncontacting proximity to the inner side of the rotary head. The drum and the rotary head are substantially rotationally symmetric about a common axis.

A plurality of radially moveable plates respond to a mechanical control mechanism that is adapted to move each plate from a retracted position in which the each plate is located entirely within the outer surface of the drum and an extended position in which the each plate is in close proximity to an upper surface of the expansion chamber to substantially seal the expansion chamber. At least one of the plates is substantially always present between the intake slot and the exhaust slot such that when the combustion gas is under pressure within the expansion chamber force is exerted on the at least one of the plates and the drum to produce rotational motion of the rotary head about the common axis.

In some of these rotary-device embodiments, the drum is free to rotate about the common axis, with the force additionally producing rotational motion of the drum about the common axis in a direction opposite to the rotational motion of the rotary head. In other embodiments, the drum is held stationary relative to the common axis.

The rotary head and the drum may be sealed with noncontacting labyrinthine seals. For example, the noncontacting labyrinthine seals may comprise a plurality of grooves substantially perpendicular to an escape direction for the combustion gas under pressure.

The rotary device may also comprise a closed track cam for positioning the plates. The plates may include sliders disposed for movement along the closed track cam. In some instances, the rotary device may also comprise sliding bushings to receive the sliders, with the sliding bushings having a conically shaped surface.

In embodiments of the invention that provide a continuous internal combustion engine, a combustor and an ignition device may be provided in addition to the rotary device, which may be embodied as part of the continuous internal combustion engine in any of the ways summarized above: The combustor is provided in fluid communication with a supply of fuel and a supply of oxidizer, with the intake slot of the expansion chamber of the rotary head being in fluid communication with the combustor. An ignition device is adapted to ignite a mixture of the fuel and oxidizer within the combustor to produce a combustion gas.

The combustor may comprise a combustor expansion chamber in fluid communication with the intake slot of the rotary-head expansion chamber. A burning chamber may be enveloped by the combustor expansion chamber, with a wall of the burning chamber including calibrate orifices to provide fluid communication between the burning chamber and the combustor expansion chamber. A mixing chamber may be enveloped by the burning chamber, with a wall of the mixing chamber including calibrate orifices to provide fluid communication between the mixing chamber and the burning chamber.

In some embodiments of the continuous internal combustion engine, the combustor rotates with the rotary head in response to the force.

The oxidizer may comprise air. An air pump in fluid communication may be adapted to pump air into the combustor. This may be achieved in different ways in different embodiments. For example, an accumulator may additionally be provided in fluid communication with the combustor and in fluid communication with the air pump, with the air pump adapted to pump air into the combustor via the accumulator. The air pump may be actuated by exhausting of the combustion gas from the exhaust slot. For instance, the continuous internal combustion engine may further comprise a turbine, with the air pump being actuated by the turbine in response to actuation of the turbine by exhausting of the combustion gas from the exhaust slot. Alternatively, the continuous internal combustion engine may comprise an auxiliary rotary device, with the air pump being actuated by the auxiliary rotary device in response to actuation of the auxiliary rotary device by exhausting of the combustion gas from the exhaust slot or directly from the combustion chamber, permitting part of the combustion gas to actuate the main rotary device for useful power and part of the combustion gas to actuate the auxiliary rotary device for air supply of the combustion chamber.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral following a hyphen to denote one of multiple similar components. When reference is made to a reference numeral without specification to an existing sublabel, it is intended to refer to all such multiple similar components.

FIGS. 1A, 1B, and 1C respectively provide side, isometric, and vertical-plane longitudinal cross-sectional views of a continuous internal combustion engine with dual rotation in one embodiment of the invention.

FIGS. 2A and 2B respectively provide a top view and a transverse cross-sectional view at the middle of the rotary device for the engine of FIGS. 1A-1C.

FIGS. 3A and 3B respectively provide a top view and a transverse cross-sectional view at sliding axes for the engine of the engine of FIGS. 1A-1C.

FIGS. 5A, 5B, and 5C respectively provide side, isometric, and horizontal-plane longitudinal cross-sectional views of a continuous internal combustion engine with dual rotation in a second embodiment of the invention.

FIGS. 6A, 6B, and 6C respectively provide a front view, a transverse cross-sectional view at sliding axes, and a horizontal-plane longitudinal cross-sectional view of an internal combustion engine with a rotary head according to a third embodiment of the invention;

FIGS. 7A and 7B respectively provide side and vertical-plane longitudinal cross-sectional views of the engine of FIGS. 6A-6C.

FIGS. 8A, 8B, and 8C respectively provide a front view, an isometric view, and a transverse cross-sectional view at sliding axes of an internal combustion engine according to a fourth embodiment of the invention.

FIGS. 9A and 9B respectively provide front and horizontal-plane longitudinal cross-sectional views of the engine of FIGS. 8A-8C.

FIGS. 10A, 10B, 10C, and 10D respectively provide a side view, an isometric view, a longitudinal cross-sectional view at a position of sparkers or a glowing rod, and a longitudinal cross-sectional view at a position of fuel injectors for a combustion chamber of the engine of FIGS. 1A-1C or of the engine of FIGS. 5A-5C.

FIGS. 11A, 11B, 11C, and 11D respectively provide a side view, an isometric view of a first side, an isometric view of a second side, and a horizontal-plane longitudinal cross-sectional view of a combustion chamber of the engine of FIGS. 6A-6C;

FIGS. 12A, 12B, and 12C respectively provide front, isometric, and horizontal-plane longitudinal cross-sectional views of a combustion chamber of the engine of FIGS. 8A-8C.

FIGS. 13A, 13B, 13C, 13D, and 13E respectively provide a side view, a front view, an isometric view, a longitudinal cross-sectional view at a position for combustion-gas intake slots, and a transverse cross-sectional view of a rotary head of the engine of FIGS. 1A-1C.

FIGS. 14A, 14B, 14C, 14D, and 14E respectively provide a side view, a front view, an isometric view, a longitudinal cross-sectional view at a position for combustion-gas intake slots, and a transverse cross-sectional view of a rotary head of the engine of FIGS. 5A-5C. FIG. 14F provides a detail view to illustrate a labyrinthine nontouching seal for sealing with an exhaust manifold. FIG. 14G provides a detail view to illustrate a labyrinthine nontouching seal for sealing with a drum.

FIGS. 15A, 15B, 15C, 15D, 15E, and 15F respectively provide left, front, isometric, right, vertical-plane longitudinal cross-sectional, and transverse cross-sectional views of a rotary head of the engine of FIGS. 6A-6C. FIG. 15G provides a detail view to illustrate a labyrinthine nontouching seal for sealing with a drum and exhaust or intake manifold.

FIGS. 16A, 16B, 16C, 16D, 16E, and 16F respectively provide left, front, isometric, right, horizontal-plane longitudinal cross-sectional, and transverse cross-sectional views of a rotary head of the engine of FIGS. 8A-8C.

FIGS. 18A, 18B, and 18C respectively provide isometric, front, and side views of plates and sliders that may be used with the engine of FIGS. 6A-6C. FIG. 18D provides a transverse cross-sectional view of a sliding rod. FIG. 18E provides a detail view of a plate to illustrate grooves for sealing.

FIGS. 20A, 20B, 20C, 20D, and 20E respectively provide front, side, isometric, transverse cross-sectional, and vertical-plane longitudinal cross-sectional views of a rotary drum for the engine of FIGS. 1A-1C.

FIGS. 21A, 21B, 21C, 21D, and 21E respectively provide front, side, isometric, transverse cross-sectional, and vertical-plane longitudinal cross-sectional views of a rotary drum for the engine of FIGS. 5A-5C.

FIGS. 22A, 22B, 22C, 22D, and 22E respectively provide front, side, isometric, transverse cross-sectional, and vertical-plane longitudinal cross-sectional views of a stationary drum for the engine of FIGS. 6A-6C or for the engine of FIGS. 8A-8C.

FIGS. 23A, 23B, and 23C respectively provide side, vertical-plane longitudinal cross-sectional, and transverse cross-sectional views of a closed-track cam with two or more uniformly distributed lobes.

FIGS. 24A, 24B, 24C, and 24D respectively provide side, front, isometric, and vertical-plane longitudinal cross-sectional views of an air accumulator for the engine of FIGS. 1A-1C.

FIGS. 25A, 25B, 25C, and 25D respectively provide side, front, isometric, and vertical-plane longitudinal cross-sectional views of an air accumulator for the engine of FIGS. 5A-5C.

FIGS. 27A, 27B, and 27C respectively provide side, isometric, and horizontal-plane longitudinal cross-sectional views of an exhaust manifold for the engine of FIGS. 5A-5C or for the engine of FIGS. 6A-6C, or for an exhaust or intake manifold for the engine of FIGS. 8A-8C. FIG. 27D provides a detail view to illustrate a labyrinthine nontouching seal for sealing with a rotary head.

FIGS. 28A, 28B, and 28C respectively provide isometric, front, and horizontal-plane longitudinal cross-sectional views of a shaft with incorporated air supply for the engine of FIGS. 1A-1C.

FIGS. 30A and 30B respectively provide a front view and a transverse cross-sectional view of a compact-seal assembly.

FIGS. 31A and 31B respectively provide a front view and a transverse cross-sectional view of another compact-seal assembly.

FIGS. 33A, 33B, and 33C respectively provide detail isometric, front, and vertical-plane longitudinal cross-sectional views of the compact-seal assembly of FIGS. 31A and 31B.

DETAILED DESCRIPTION OF EXEMPLARY EMBODIMENTS

Embodiments of the invention provide a high-performance continuous internal combustion engine. The engine generally comprises a combustion chamber, a fuel system that delivers a fuel-air mixture to the combustion chamber for ignition, and a rotary device. The rotary device generally comprises a drum, a rotary head, and a number of plates. The drum and rotary head may each have a rotationally symmetric shape centered about a common rotational axis, with the inside of the rotary head being in close proximity to the outside of the drum. One or more expansion chambers are uniformly distributed on the circumference of the rotary head.

The plates move through lengthwise slots provided in the outer revolving body of the drum between retracted positions in which plates are located entirely within the outer surface of the drum, and extended positions, in which plates extend to be in close proximity of the upper surface of each expansion chamber, thereby practically sealing the expansion chambers in the rotary head. Each expansion chamber comprises a combustion-gas intake slot on an opposite side from a combustion-gas exhaust slot. Between the slots, a plate is always present so that when the combustion gas is under pressure the plate and drum are pushed, resulting in rotation of the rotary head, until the plate reaches the exhaust slot where the gas under pressure is released, thus producing work.

Overview of Engine Structure

Figures 4A, 4B:
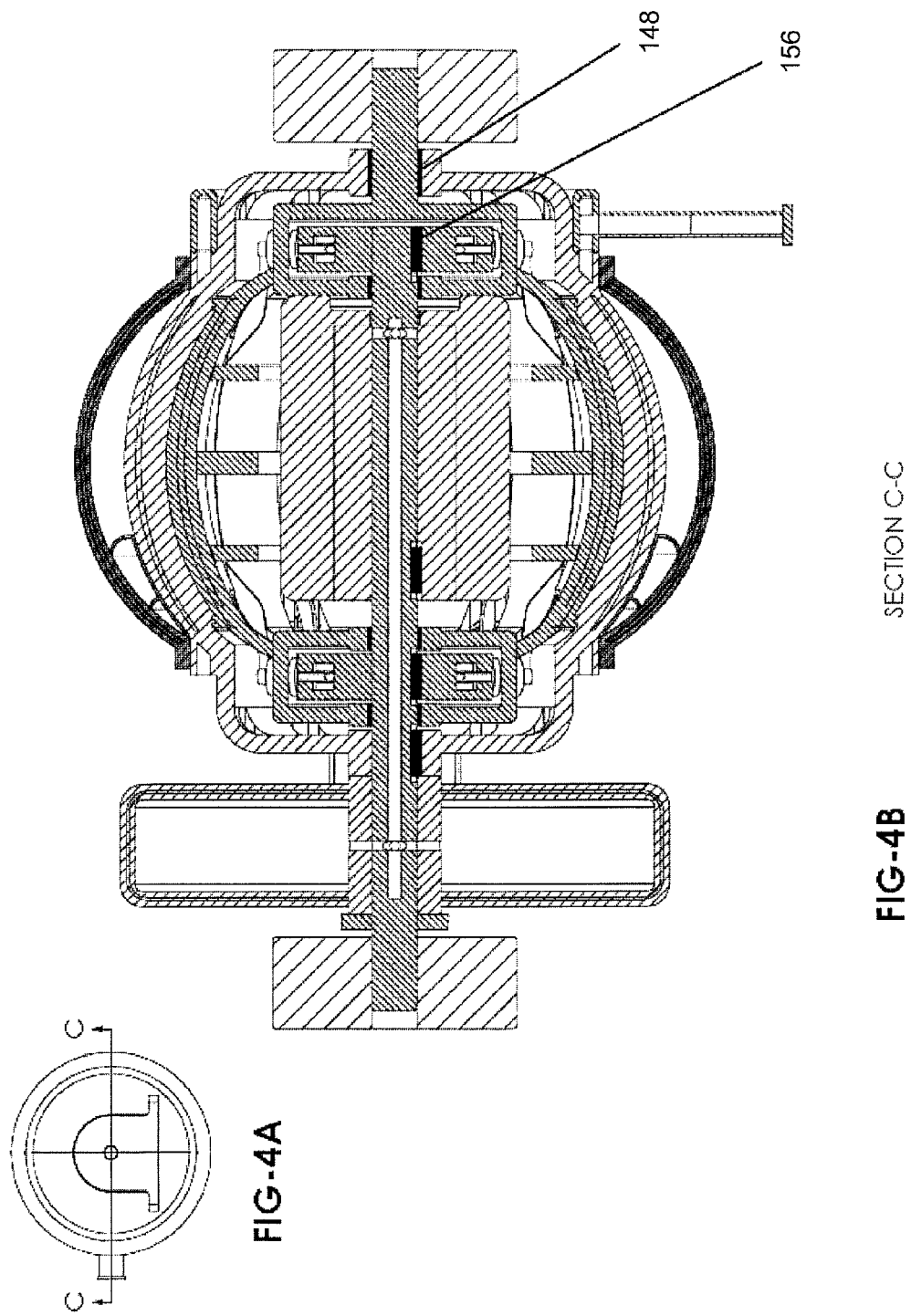
FIGS. 4A and 4B respectively provide top and horizontal-plane longitudinal cross-sectional views of the engine of FIGS. 1A-1C.

The drawings are provided for a schematic illustration of features of the invention. They are not drawn to scale and certain parts, such as seals and other auxiliary parts, that are not essential to explain the operation of the internal combustion engine are omitted. A first embodiment is illustrated with FIGS. 1A-4B. FIGS. 1A, 1B, and 1C provide side, isometric, and vertical-plane longitudinal cross-sectional views of the engine, which operates with dual rotation. FIGS. 2A and 2B provide a top view and a transverse cross-sectional view at the middle of the rotary device, while FIGS. 3A and 3B provide a top view and a transverse cross-sectional view at sliding axes. Top and horizontal-plane longitudinal cross-sectional views are illustrated with FIGS. 4A and 4B.

Figure 29B:
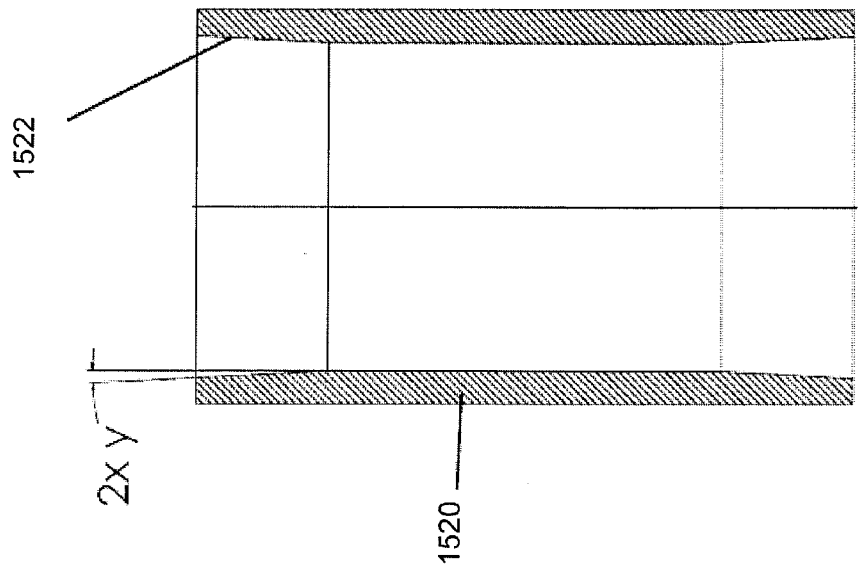
FIGS. 29A and 29B respectively provide front and longitudinal cross-sectional views of a sliding bushing used in embodiments of the invention.
Figure 29A:
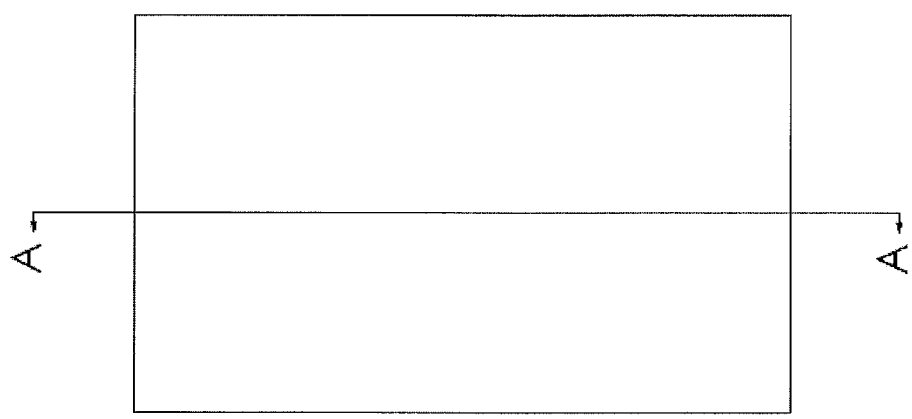
Figure 31A:
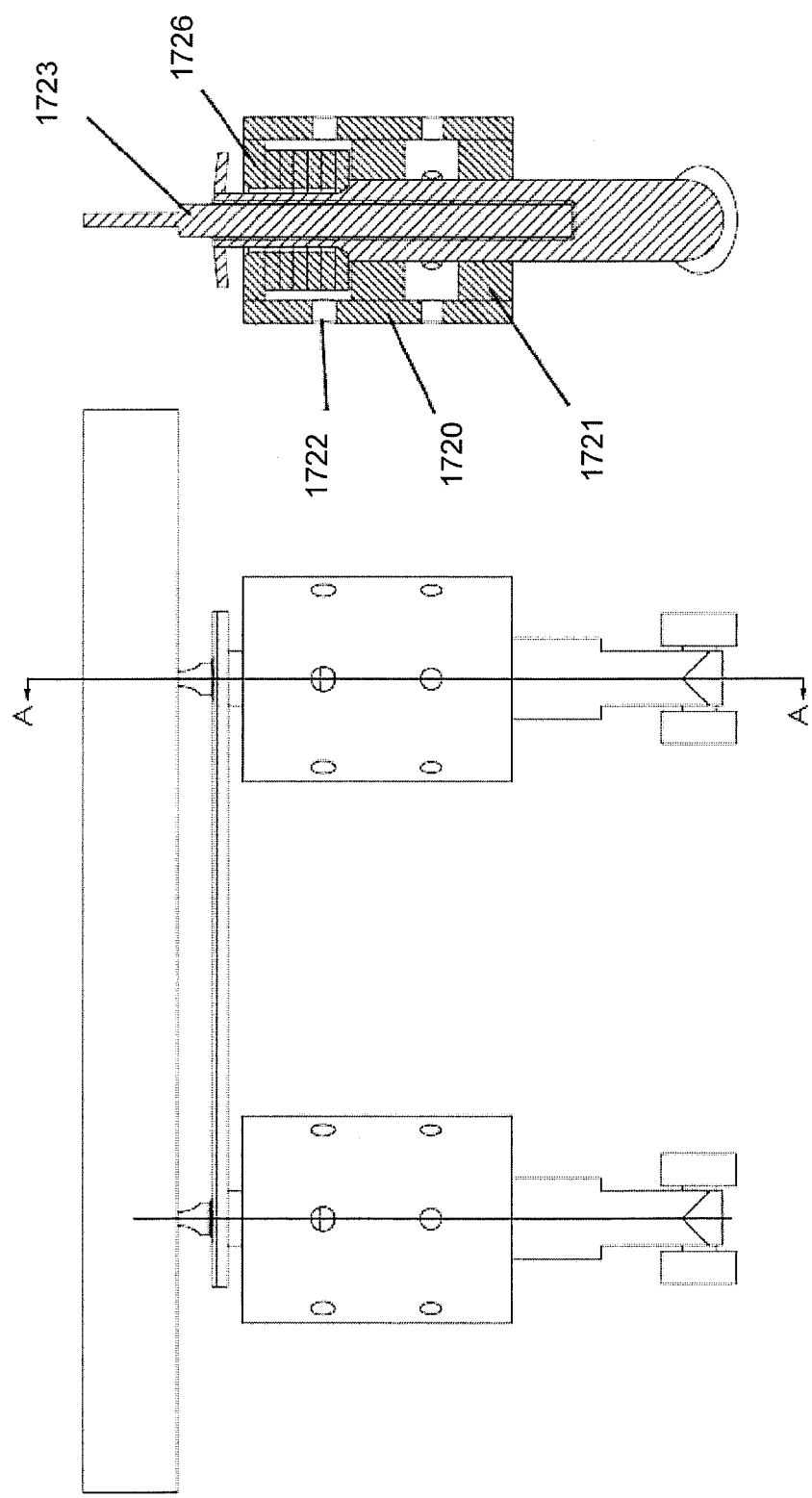

The internal combustion engine comprises a combustion chamber 104 that is fixedly coupled to a rotary head 108 so that the two move together. The rotary head 108 may also move in combination with an air accumulator 124, closed track cams 120, a fuel rotating union 152, and an inner part of an air pump 144. These parts are interconnected to provide the combined movement through a shaft 140 and keys 156 (see FIGS. 3B and 4B). A rotary drum 116 moves together with the outer part of the air pump 144 and with a plurality of plates 112 that slide in bushings located in slide boxes on each side of the drum 116. Exemplary structures for the slider bushings are discussed further below in connection with FIGS. 29A and 29B. A rotating union 152 allows for the intake of fuel, which, merely by way of example, may include diesel, gasoline, petroleum gas, propane, or the like, and an exhaust manifold 128 allows for exhausting combustion products from the engine. Journal bearings 148, only some of which are explicitly identified, may be used to couple the various structures. While the drawings show the use of planetary reducers 132 and 136 to gear the engine when coupled with a vehicle, the invention is not limited to the use of planetary gearing and other types of gearing mechanisms known to those of skill in the art may be used in alternative embodiments.

In operation, air is provided to the engine via the air accumulator 124, which is provided in fluidic communication with the combustion chamber 104. It will be appreciated that while "air" is referred to herein as a suitable oxidizer for the combustion reactions, other oxidizers may be provided to the combustion chamber 104 in alternative embodiments such as may be appropriate for certain specialized applications for the engine. Fuel is supplied to the air stream between the air accumulator 124 and the combustion chamber 104 via the rotating union 152 so that the air-fuel mixture may be ignited within the combustion chamber 104.

The combustion gases are provided under pressure and will have nowhere to escape but through an intake slot comprised by the rotary head 108 and thereby be directed to an expansion chamber, described in greater detail in connection with FIGS. 13A-13E below. Here, the gases under pressure push the plates 112, creating a reactive force that pushes in the opposite end of the expansion chamber to make the rotary head 108—and all parts connected with the rotary head 108—rotate in one direction. The plates with the rotary drum 116, together with the outside of the air pump 144 rotate in the opposite direction because the rotary head 108 actuates the first planetary reducer 132 through the shaft 140. The rotary drum 116 similarly actuates the second planetary reducer 136 through a second shaft discussed in further detail in connection with FIGS. 20A-20E. When the engine is coupled with a vehicle, the planetary reducers 132 and 136 may thereby impart rotational motion to wheels.

When the rotary head 108 and rotary drum 116 begin to rotate, the rotary drum 116 starts to rotate the outer part of the air pump 144 and the rotary head 108 starts to rotate the inner part of the air pump 144, creating a pumping effect that supplies air to the air accumulator 124. Having both the rotary head 108 and the rotary drum 116 rotate has a number of beneficial consequences. For example, at a certain rate of revolution, the power output is doubled as a result of the dual rotation. Merely by way of example, if the rotary drum 116 has a rotation speed of 10,000 RPM and the rotary head 108 has an equal rotation speed in the opposite direction, the relative rotation speed between the rotary drum 116 and the rotary head 108 is 20,000 RPM. The stress in each of the rotary head 108 and the rotary drum 116 corresponds to that induced by a rotation speed of 10,000 RPM while the power generated corresponds to that for a rotation speed of 20,000 RPM. Since centrifugal forces are proportional to the square of the rotation speed, this results in a stress decrease of four time for a given power output.

In addition, because both the rotary drum 116 and the rotary head 108 are in rotational motion, each has deformations resulting from the centrifugal forces that are approximately the same, decreasing the loss of combustion gases through gaps and increasing efficiency. The dual rotation thereby enables operations to be performed with higher rotational speeds than in designs that have only single rotation, allowing even greater power output A second embodiment is illustrated with FIGS. 5A-5C, which provide side, isometric, and horizontal-plane longitudinal cross-sectional views of an embodiment that also operates with dual rotation. The design is conceptually similar to the design described in connection with FIGS. 1A-4C. A combustion chamber 204 is fixedly coupled to a rotary head 208 so that the two move together, also in combination with an air accumulator 220, closed-track cams 216, and a fuel rotary union 248. These parts are interconnected to provide the combined movement through a shaft 236 and keys 252. A rotary drum 212 moves a plurality of plates similarly to as described in connection with the previous embodiment to achieve dual rotation of the rotary head 208 and rotary drum 212. An exhaust manifold 224 is provided to exhaust combustion products from the engine, and planetary reducers 228 and 232 may be provided to gear the engine when coupled with a vehicle. Journal bearings 244, only some of which are explicitly identified, may be used to couple the various structures.

In this embodiment, the combustion chamber 204 may have a rotationally symmetric shape that rotates with the rotary head 208; alternatively, the combustion chamber 204 may be provided in a stationary configuration, in which case the combustion chamber 204 envelopes the rotary head with a dynamic seal between the combustion chamber 204 and rotary head 208 on each side, and with a fixed air accumulator 220.

Air may be provided directly to the combustion chamber 204 from an air pump 240. In configurations where the combustion chamber 204 rotates, exhaust gas may be used to rotate a turbine 256 that actuates the air pump 240 to supply air to the air accumulator 220, which rotates together with the rotary head 208. As explained in further detail below in connection with FIGS. 27A-27D, a valve may be used to adjust the exhaust gases being directed to the turbine 256 so that the flow to the air accumulator 220, with the remainder of the exhaust gases being evacuated directly to the atmosphere. This embodiment allows for easy and accurate control over the supply of air to the air accumulator 220 or directly to the combustion chamber 204, enabling the engine to function efficiently in a wide variety of operational conditions. Fuel is added to the airstream through the fuel rotary union 248 to enable combustion within the combustion chamber 204 and the production of energy in a manner similar to that described above.

Other embodiments employ a single-rotation configuration, such as illustrated for an embodiment with FIGS. 6A-7B. FIGS. 6A, 6B, and 6C provide a front view, a transverse cross-sectional view at sliding axes, and a horizontal-plane longitudinal cross-sectional view of the engine. Side and vertical-plane longitudinal cross-sectional views are shown in FIGS. 7A and 7B.

In this engine, only the rotary head 304 rotates while the drum 312 is held stationary by the combustion chamber 332 through a key 324. When the engine is deployed in a vehicle, the combustion chamber 332 may be held in position by a chassis frame of the vehicle (not shown). Bearing blocks 340 may be provided on each side of the structure and journal bearings 328 may be employed to couple various of the components. The rotary head 304 is shown in the drawings as having a cylindrical shape, but this is not a requirement of the invention. More generally, the rotary head 304 may comprise any rotationally symmetric shape, including, for example, spherical, oval, and ellipsoidal shapes.

In this embodiment, the rotary head 304 rotates together with cams 316 and the inner part of the air pump 336 through a shaft 320 and keys 324. The outside part of the air pump 336 is held stationary by the combustion chamber 332. When a fuel-air mixture is ignited within the combustion chamber 332, the pressure of the combustion gases pushes plates 308 that in turn push the drum 312. Because the drum 312 is fixed, reaction forces are applied to the rotary head 304. Combustion products may be evacuated to the atmosphere through an exhaust manifold 310.

Because only the rotary head 304 rotates and not the drum 312, centrifugal forces act just on the head 304, resulting in deformation of the head 304 that is not duplicated on the drum 312. This may be accommodated by minimizing gaps between the rotary head 304 and the drum 312 and/or between the rotary head 304 and the plates 308. In one embodiment, discussed in greater detail below in connection with FIGS. 15A-15G, rigidity ribs are used, although other techniques may be used in alternative embodiments to limit gaps.

One consequence of having a fixed drum 312 is that oil for lubrication and for the plates is not subject to centrifugal forces, simplifying providing seals within the engine structure.

A further embodiment is illustrated with the drawings of FIGS. 8A-9B. FIGS. 8A, 8B, and 8C show a front view, an isometric view, and a transverse cross-sectional view at sliding axes, while FIGS. 9A and 9B respectively provide front and horizontal-plane longitudinal cross-sectional views of the engine.

Like the previous embodiment, in this embodiment only the drum 416 is held in a stationary position, in this illustration by a holding block 440. The rotary head 408, which rotates together with cams 420 through a shaft 424 and keys 428, has intake or exhaust passages on both sides to direct combustion gases to intake or exhaust slots. Bearing blocks 444 may be provided and journal bearings 432 may be employed to couple various components. A valve on an intake or exhaust manifold 424 may be used to control a ratio of combustion gases from a combustion chamber 404 that are supplied to the rotary head 408 and exhausted to the atmosphere. In this way, the direction of rotation of the rotary head 408 may be adjusted, permitting a direction of a vehicle powered by the engine to be changed. In this illustration, the combustion chamber 404 is disposed in the back of the rotary head 408, making it easier to accommodate between sets of wheels comprised by the vehicle.

Combustion gases from the combustion chamber 404 are supplied to an auxiliary rotary device 436 that actuates an air pump 432. A valve may be used to control the relative portion of the combustion gases that are directed to the auxiliary rotary device 436, thereby controlling the quantity of air supplied to the combustion chamber 404 according to working conditions. Similar to the operation of the previously described embodiment, gases under pressure push plates 412 to exert a force on the drum 416, the reactive force being exerted on the rotary head 408.

Combustion Chamber

Different configurations may be used for the combustion chamber for the different engine configurations. FIGS. 10A-10D illustrate one embodiment of a combustion chamber that may be used in embodiments of the dual rotation engines (i.e. with the engines described in connection with FIGS. 1A-4B or with FIGS. 5A-5C), with the different drawings providing a side view, an isometric view, a longitudinal cross-sectional view at a position of sparkers or a glowing rod, and a longitudinal cross-sectional view at a position of fuel injectors.

In these drawings, the combustion chamber is defined by a body 504 that may be lined with a thermally insulating material 508 such as aluminized fabric or fiberglass. In addition to an expansion chamber 540, the combustion chamber may comprise a burning chamber 512 and a mixing chamber 516. Air and fuel are respectively provided to the mixing chamber 516 via an air-intake passage 520 and a fuel injector 524 so that they may mix for ignition in the burning chamber 512 with a sparker or glowing rod 528 according to mechanisms well known in the art. The subchambers may be separated by walls, specifically a first wall separation 532 between the mixing chamber 516 and the burning chamber 512 and a second wall separation 536 between the burning chamber 512 and the expansion chamber 540. Each of these wall separations 532 and 536 is preferably structured to allow fluid communication between the subchambers, such as by having perforated wall separations.

Another embodiment for a combustion chamber suitable for use with the internal combustion engine described in connection with FIGS. 6A-6C. This is illustrated in FIGS. 11A-11D, which provide a side view, an isometric view of a first side, an isometric view of a second side, and a horizontal-plane longitudinal cross-sectional view. The combustion chamber comprises a body expansion chamber 604, a burning chamber 608, and a mixing chamber 612, which are shown in the illustrated embodiment as nested tori disposed within an expansion chamber 648, although other configurations are also within the scope of the invention. Structural support for the combustion chamber is provided with a hub 640 and key slots 644 for integrating with other components of the engine.

Fluidic communication between the mixing chamber 612 and the burning chamber 608 is provided with perforations 632 in a wall that defines the mixing chamber 612. Similarly, fluidic communication between the burning chamber 608 and the body expansion chamber 604 is provided with perforations 636 in a wall that defines the body expansion chamber 604. Lower and upper sealing lips 616 and 620 enable a sealed connection to be established for a combustion-gas supply passage 664 from the expansion chamber 648 to the rotary head.

The amount of fuel provided to the mixing chamber 612 from fuel injectors 652 may be controlled with a variety of methods known to those of skill in the art. Similarly, the amount of oxidizer provided to the mixing chamber may be controlled by valves 656 from the air pump along the supply passage 624. Ignition of the fuel-oxidizer mixture is achieved within the burning chamber 608 with a spanker or glow rod 628. An air valve 660 to the atmosphere may advantageously used to provide an alternative oxidizer supply to initiate combustion. Specifically, in embodiments where the engine is used to drive a vehicle, air valve 660 may be open when the acceleration pedal is not pressed, allowing air to be pumped to provide braking pressure, or to leave the vehicle running when no brake is desired. In this way, air in the combustion chamber is prepared for the next pressing of the acceleration pedal by providing air to burn the first fuel injected, starting the cycle and rotating the air compressor to pump air into the combustion chamber. The size of the combustion chamber is accordingly appropriate to provide sufficient oxidizer to begin a new working cycle.

Still another embodiment for the combustion chamber, suitable for the engine described in connection with FIGS. 8A-8C is illustrated with FIGS. 12A-12C. These drawings provide front, isometric, and horizontal-plane longitudinal cross-sectional views. The basic operation of the combustion chamber is similar to that described for the other embodiments.

The combustion chamber comprises an expansion chamber 704, a burning chamber 708, and a mixing chamber 712, which are again provided in a nested configuration. This embodiment illustrates such nesting in a nontoroidal configuration. Fluidic communication between the different subchambers is provided with perforations, including the perforations 732 in the wall that defines the mixing chamber 712 so that there is fluidic communication with the burning chamber 708 and the perforations 736 in the wall that defines the body burning chamber 708 so that there is fluidic communication with the body expansion chamber 704. Oxidizer is provided from the air pump through an air-supply passage 716 and fuel is provided with a fuel injector 720 so that the mixture may be ignited by a sparker or glow rod 724. An air valve 740 permits air to be sealed within the combustion chamber when it is burning fuel, and will open when not burning fuel and a braking function is not desired. This valve may also be open when an acceleration pedal is not actuated and the brake pedal is actuated, allowing braking by restricting the flow of exhaust gas with the valve on the exhaust ducts.

Additional air passages may be provided to effect fluidic communication with other parts of the engine. For example, to accommodate the auxiliary rotary device 436 of the engine described in connection with FIGS. 8A-8C, an secondary air supply passage 728 may be provided in fluidic communication with the auxiliary rotary device 436. In addition, air passages 744 and 748 provide for the transfer of air with the two sides of the rotary head 408.

Rotary Head

Different configurations may also be used for the rotary head for the different engine configurations. FIGS. 13A-13E illustrate one embodiment of a rotary head that may be used with the dual-rotation engine described in connection with FIGS. 1A-1C. The different views include a side view, a front view, an isometric view, a longitudinal cross-sectional view at a position for combustion-gas intake slots, and a transverse cross-sectional view.

In these drawings; the rotary head is defined by a body 804 lined with a layer of thermally insulative material 808 such as aluminized fabric or fiberglass. Combustion gas that drives the rotary head is taken into an expansion chamber 856 via a combustion-gas intake slot 812 and released from the expansion chamber 856 via an exhaust slot 852 that communicates with an exhaust passage 816. Slots 860 are provided within walls of a hub defined by hub sides 832 and 844 to allow air to circulate for cooling. Coupling with other components of the engine is achieved with sealing lips 820 and 824, as well as sealing lip 836, which permits mating with a corresponding sealing lip on the rotary drum. Support 840 and key slot 848 permit mating with the combustion chamber and shaft.

Combustion gases generated by the combustion chamber are directed to the rotary head under pressure, having nowhere to escape but through the intake slot 812, reaching the expansion chamber 856. Here, the gases under pressure activate rotation of the rotary head. Combustion gases are exhausted from the rotary head through the exhaust slots 852, which are positioned on opposite sides of the expansion chamber 856 from the intake slot 812, to the exhaust passage 816. Before one plate reaches an exhaust slot 812, another plate is sealing the intake slot 812 so that combustion gases are not exhausted from the rotary head without the production of work.

Another embodiment for the rotary head is illustrated with FIGS. 14A-14G. This embodiment is especially suitable for incorporation into the engine described in connection with FIGS. 5A-5C. The basic structure is similar to that described in connection with FIGS. 13A-13E. FIGS. 14A-14E provide a side view, a front view, an isometric view, a longitudinal cross-sectional view at a position for combustion-gas intake slots, and a transverse cross-sectional view.

The rotary head comprises a body 904 lined with a thermal insulator 908 such as aluminized fabric or fiberglass. In this embodiment, combustion gases are directed through an intake slot 912 to an expansion chamber 948 where combustion gas may be exhausted through an exhaust slot 944 to an exhaust passage 916 after generating plate rotation to produce work. A hub defined by structures 934 and 936 includes slots 952 to provide for air circulation to allow cooling. Sealing with other parts of the engine, including the combustion chamber, is achieved with structural support 932 and key slot 940.

FIG. 14F shows a detail view to illustrate a labyrinthine nontouching seal for sealing with an exhaust manifold, illustrating structure for the upper and lower sealing lips 920 and 924 in detail. FIG. 14G provides a detail view to illustrate a labyrinthine nontouching seal for sealing with a drum head, showing in detail the sealing lip 928 that mates with a drum sealing lip.

A further embodiment for a rotary head suitable for use with the engine described in connection with FIGS. 6A-6C is illustrated with FIGS. 15A-15F. Left, front, isometric, right, vertical-plane longitudinal cross-sectional, and transverse cross-sectional views are provided with FIGS. 15A-15F.

The rotary head is defined by a body 1004 within which a layer of thermal insulation 1008 is provided. A rigidity rib 1012 provides structural integrity to the rotary head and also includes a layer of thermal insulation 1016. While the shape of the rotary head is shown in these drawings to be generally cylindrical, this is not a requirement of the invention and in other embodiments, the rotary head may have a generally spherical, generally ellipsoidal, or other shape. Sealing of the rotary head within the engine is achieved in a manner similar to that described with the other embodiments. For example, sealing lips 1028 and 1036 around the intake passage 1032 mesh with corresponding sealing structures on the combustion chamber, specifically sealing lips 616 and 620 described above. Key slots 1056 and hub structures 1024 and 1052 enable coupling of the rotary head to other components of the engine. Slots 1072 in the hub walls are for cooling.

Combustion gases are pushed through the intake passage 1032 and intake slots 1060 into expansion chambers 1068. Here, the pressure of the combustion gases pushes the plates of the engine and when they reach the exhaust slots 1064, they are exhausted to the atmosphere through air passages 1044.

In addition to sealing the rotary head to the combustion chamber with sealing lips 1028 and 1036, sealing is achieved with other labyrinthine parts illustrated in the detail of FIG. 15G. Sealing lip 1020 enables sealing with the drum, and lips 1040 and 1048 provide lips for the exhaust passage.

Still another embodiment of the rotary head suitable for use with the engine described in connection with FIGS. 8A-8C is illustrated with FIGS. 16A-16F. They provided left, front, isometric, right, horizontal-plane longitudinal cross-sectional, and transverse cross-sectional views of the rotary head.

The rotary head has a body 1104 with a hub having sides 1112 and 1168. Sealing lips 1108 provide for mating with the drum. The rotary head has intake or exhaust passages 1120 and 1132 on both sides of the hub, and has intake or exhaust passage tubes 1128 and 1144 on both sides of the hub. Each of these structures may include lips lower and upper lips 1116 and 1124 or lower and upper lips 1136 and 1140 to allow for sealing with other components of the engine. Key slot 1152 allows for coupling of the rotary head to other structures of the engine.

As will be appreciated by those of skill in the art, the flow direction through the rotary head may be in either direction so that each of these structures may be used either for intake or exhaust depending on the operational configuration of the engine. That is, combustion gases from the combustion chamber may supply the rotary head on either side, with the exhaust being on the opposite side, enabling the direction of rotation of the rotary head to be changed. In embodiments where the engine is comprised by a vehicle, this allows the direction of motion of the vehicle to be changed in a corresponding way.

The combustion gases are provided to an expansion chamber 1148 through intake or exhaust slots 1160 and 1164 and operation of the rotary head using pressure from the combustion gases to generate rotation is similar to that described above. Slots 1156 allow for air circulation to provide cooling.

Plates and Sliders

Figure 17B:
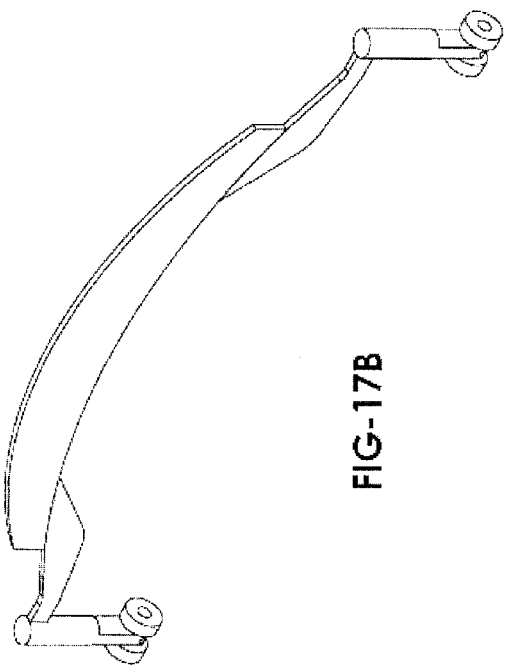
FIGS. 17A, 17B, and 17C respectively provide side, isometric, and front views of plates and sliders that may be used with the engine of FIGS. 1A-1C or with the engine of FIGS. 5A-5C.
Figure 17A:
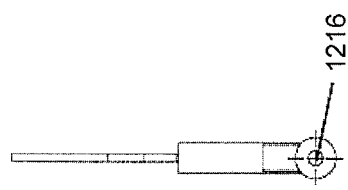
Figure 17C:
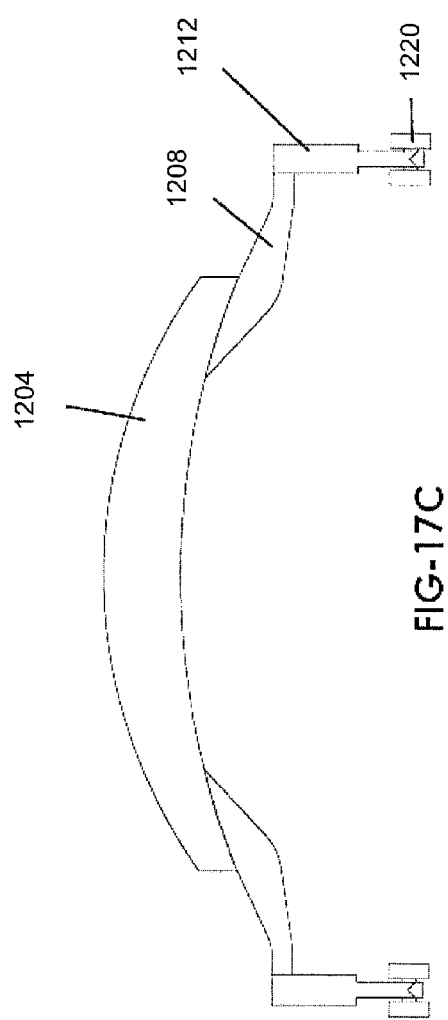

FIGS. 17A-17C provide side, isometric, and front views of plates and sliders that may be used with the dual-rotation engines described in connection with FIGS. 1A-4B and FIGS. 5A-5C. They provide side, isometric, and front views, with each plate 1204 being coupled with a plate sliding rod 1212 through a plate link 1208. Rollers 1220 are coupled to roller shafts 1216 that are mechanically coupled with the plate sliding rod 1212.

Figure 19A:
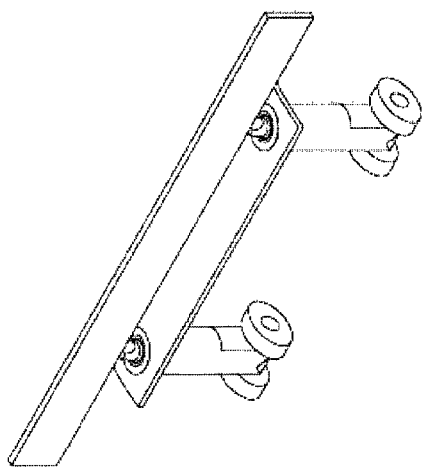
FIGS. 19A, 19B, and 19C respectively provide isometric, side, and front views of plates and sliders that may be used with the engine of FIGS. 8A-8C.
Figure 19C:
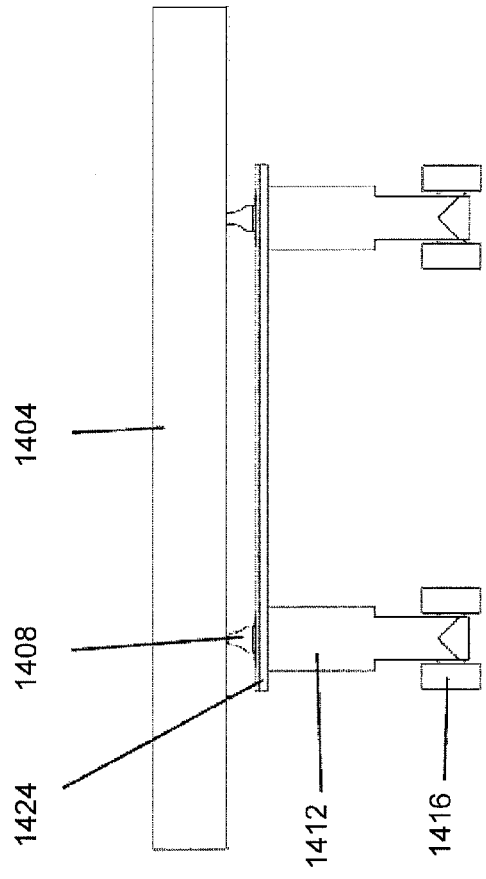
Figure 19B:
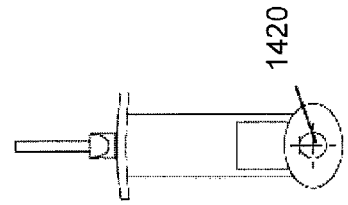

The cams described above operate as closed-track cams, ensuring that the rollers 1220 follow the profile of the cams at high rotation rates. Since the cams rotate together with the rotary head, the relative position of the plates 1204 is maintained in a desirable position relative to the rotary-head expansion chamber to prevent the release of combustion gases under pressure. In some embodiments, particularly those where the rotation rate of the rotary head is very high, it is preferable to substitute the roller arrangement shown in FIG. 17C with a slider arrangement as shown in FIGS. 19A-C below.

An arrangement suitable for use with the engine described in connection with FIGS. 6A-6C is shown in FIGS. 18A-18E. FIGS. 18A-18C provide isometric, front, and side views in which each plate 1304 is coupled with a plate sliding rod 1312 through an elastic link 1308 and a rigid link 1324. Rollers 1316 are coupled to roller shafts 1320 that are mechanically coupled with the plate sliding rod 1312.

FIG. 18D provides a transverse cross-sectional view of a sliding rod to illustrate the presence of insulation 1328. Generally, all parts that come into contact with hot combustion gases may preferably be insulated to keep heat from being lost to the atmosphere before the production of work.

FIG. 18E provides a detail of the plate to illustrate the sealing grooves 1332. Grooves similar to these may be used with the various seals described above and below. The dynamic sealing is performed with labyrinthine lips that mesh together in various configurations. The grooves 1332 are generally provided in a direction perpendicular to the relative flow of escaping combustion gases under pressure, the effect of which is to make the flow of any escaping combustion gases turbulent so that loss of gas is reduced, thereby increasing the efficiency and power of the engine. Generally, the plates and other parts that have relative movement within the engine are not provided in direct contact. Rather, direct contact is only provided at the plate sliding rods where lubrication and cooling are provided.

A further illustration is provided with FIGS. 19A-19C, which show isometric, side, and front views of plates and sliders suitable for use with the engine described in connection with FIGS. 8A-8C. In these embodiments, each plate 1404 is coupled with a plate sliding rod 1412 through an elastic link 1408 and a rigid link 1424. Sliders 1416 are provided instead of rollers in the other embodiments and, as mentioned above, sliders may be substituted for rollers in those other embodiments, particularly when the engine is to be used in applications having a high rotational speed. The sliders are coupled mechanically to the plate sliding rods 1412 through slider shafts 1420.

Drum

The drum may also take different configurations in different embodiments, some of which include a rotary drum and others of which include a stationary drum. An example of a rotary drum is shown with FIGS. 20A-20E. This configuration is especially suitable for the dual-rotation embodiment described in connection with FIGS. 1A-4B and the views in the drawing provide front, side, isometric, transverse cross-sectional, and vertical-plane longitudinal cross-sectional views.

The drum has a body 1504 lined with thermal insulation 1508 within which rigid support rings 1512 define the structure of the drum. Although three rings are shown, the invention is not limited by a particular number of rings and the rotary drum may comprise a different number in alternative embodiments. The body 1504 itself may be fabricated as a single piece and include a shaft 1540. The rings increase the rigidity and strength of the drum and also provide support and guidance for the plates. Rotating-drum slider boxes 1524 and 1536 are disposed outside the rotary drum body 1504, simplifying assembly of the engine, especially of the plates. Slider bushings 1520 may have a conical surface, as discussed in greater detail in connection with FIGS. 29A-29B.

Sealing lips 1532 provide for coupling of the rotary drum with the rotary head, such as in embodiments where sealing lips 1532 of the rotary drum shown in FIGS. 20A-20E mesh with sealing lips 836 of the rotary head shown in FIGS. 13A-13E. Slots 1516 are shape and configured to receive the plates and slots 1544 in walls of the body 1504 may be provided for air circulation. Bushing bores 1528 support the shaft.

Another embodiment of the rotary drum suitable for use with the dual-rotation engine described in connection with FIGS. 5A-5C is illustrated with FIGS. 21A-21E. These drawings provide front, side, isometric, transverse cross-sectional, and vertical-plane longitudinal cross-sectional views of the rotary drum.

Similarly to the previous embodiment, the rotary drum is defined by a body 1604 lined with insulation 1608 and including a plurality of rings 1612 to provide rigid support. The body 1604 includes a shaft 1640. Rotating-drum slider boxes 1624 and 1636 are disposed outside the body 1604, and slider bushings 1620 may have a conical shape Sealing lips 1632 provide for sealing of the rotary drum to the rotary head. Plate slots 1616 are disposed and shaped to receive the plates and slots 1644 in wall of the body 1604 are provided for air circulation. Bushing bores 1528 support the shaft. This embodiment differs from the previous embodiment primarily in the configuration of the shaft 1640.

The embodiment for the stationary drum illustrated with FIGS. 22A-22E is suitable for use with the single-rotation engines described herein, i.e. those described in connection with FIGS. 6A-6C and 8A-8C. The drawings provide front, side, isometric, transverse cross-sectional, and vertical-plane longitudinal cross-sectional views.

The stationary drum comprises a plurality of nested concentric cylinders, shown in the drawings as including an outer cylinder 1704, an intermediate cylinder 1708, and an inner cylinder 1712. Between the inner and intermediate cylinders 1708 and 1712, slider bushing bodies 1720 are disposed. Inside the inner cylinder 1712, a lubricant such as oil may be provided. On the side walls between the outer and intermediate cylinders 1704 and 1708, a plurality of holes 1748 may be provided for air to circulate and thereby provide cooling. In addition, between the intermediate and inner cylinders 1708 and 1712, a plurality of cooling fins 1716 may be provided from one side wall 1732 to the other 1736 so that air circulates between the resulting passages to draw heat away from the drum. This functions in a manner similar to a radiator incorporated within the drum. In an alternative embodiment, it an evaporator may additionally be provided within the drum between the intermediate and inner cylinders 1708 and 1712 to act similar to an air-conditioning system. In such an embodiment, high cooling power can thereby be provided to the drum.

The two sides of a hub are denoted with reference numbers 1740 and 1744. One or more rigidity rings 1728 may be included to increase the rigidity of the outer cylinder 1704 A key slot 1756 is used to hold the drum stationary, and may be coupled with the combustion chamber hub 640 through key slot 644. Sealing lips 1752 may be used to seal the drum to the rotary head.

Cam

FIGS. 23A-23C provide side, vertical-plane longitudinal cross-sectional, and transverse cross-sectional views of a closed-track cam as may be employed in the various embodiments. The cam comprises an upper lip 1804, a closed track 1808, a cam profile 1812, and a key slot 1816. The cam profile 1812 comprises a plurality of lobes, shown in the illustration as having two lobes, although a single lobe or a number of lobes greater than two may be provided in alternative embodiments. Generally, the lobes are uniformly distributed about the perimeter of the cam profile 1812 and are equal in number and distribution to the expansion chambers comprised by the rotary head. This ensures that the stress in the drum and head are provided as primarily or pure torque with little or no radial force when the number of cam lobes and expansion chambers in the rotary head is two or more. Radial forces that do exist arise entirely or almost entirely from the weight of the engine and are accordingly small.

Air Accumulator

Embodiments of the air accumulator for the dual-rotation engines are illustrated with FIGS. 24A-24D and 25A-25D. An air accumulator suitable for use with the dual-rotation engine described in connection with FIGS. 1A-4B is shown with side, front, isometric, and vertical-plane longitudinal cross-sectional views in FIGS. 24A-24D. The air accumulator is defined by a body 1904 that is lined with insulation 1908. A hub 1912 has a plurality of holes 1916 for the flow of an air supply from the air pump. Air supply tubes 1920 provide oxidizer to the combustion chamber, regulated by air supply valves 1924.

The embodiment of FIGS. 25A-25D, which show side, front, isometric, and vertical-plane cross-sectional views, is suitable for use with the dual-rotation engine described in connection with FIGS. 5A-5C. It has a body 2004 lined with insulation 2008 and a hub 2012 coupled with a rotary union 2016 to receive air from the air pump. A one-way check valve 2028 coupled with the rotary union 2016 ensures airflow in the desired direction. While shown explicitly in this embodiment, such check valves may also be used in the embodiment of FIGS. 24A-24D, even though not shown in such an illustration. Flow to the combustion chamber is provided by air supply tubes 2020 and controlled by air supply valves 2024.

A suitable air pressure in the air accumulator in these embodiments is about 150 PSI, and a suitable maximum pressure in the engine in different embodiments is about 100 PSI. Because the pressure is relatively low, combustion temperatures are also relatively low, making it possible to limit the combustion temperature to less than 1400° C. even without cooling. With the insulation that has been described above, heat losses are minimized and the efficiency of the engines are increased.

Exhaust and Intake Manifolds

An example of an exhaust manifold that may be used in embodiments of the invention is shown in FIGS. 26A-26D. This embodiment is particularly suitable for use with the dual-rotation engine of FIGS. 1A-4B. The exhaust manifold has a body 2116 that includes a collector ring 2112 for collecting gases after they have been discharged through the exhaust passage 816 of the rotary head 108 (see FIGS. 13A-13E). They may be exhausted to the atmosphere through an exhaust tube 2108, the flow through which is controlled by an air valve 2104. When the engine is comprised by a vehicle, the air valve 2104 may aid stopping the vehicle since it may be closed to increase exhaust pressure when the acceleration pedal is not pressed. This may be performed in combination with opening a valve in the combustion chamber to let atmospheric air in so that it may be pumped and thereby increase pressure on the exhaust to enhance the braking power.

Figure 26B:
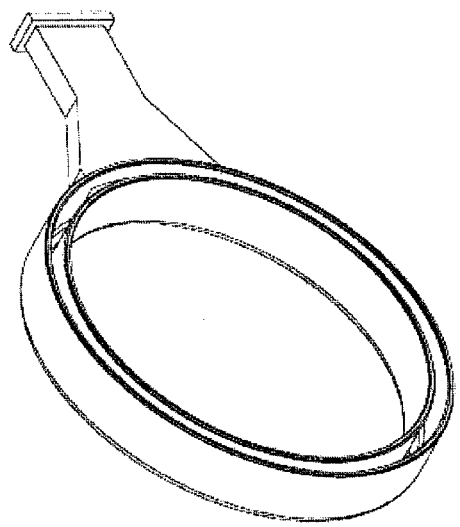
FIGS. 26A, 26B, and 26C respectively provide side, isometric, and horizontal-plane longitudinal cross-sectional views of an exhaust manifold for the engine of FIGS. 1A-1C.
Figure 26D:
FIG. 26D provides a detailed view to illustrate the upper and lower sealing lips 2120 and 2124 used to seal the exhaust manifold with the rotary head.
Figure 26A:
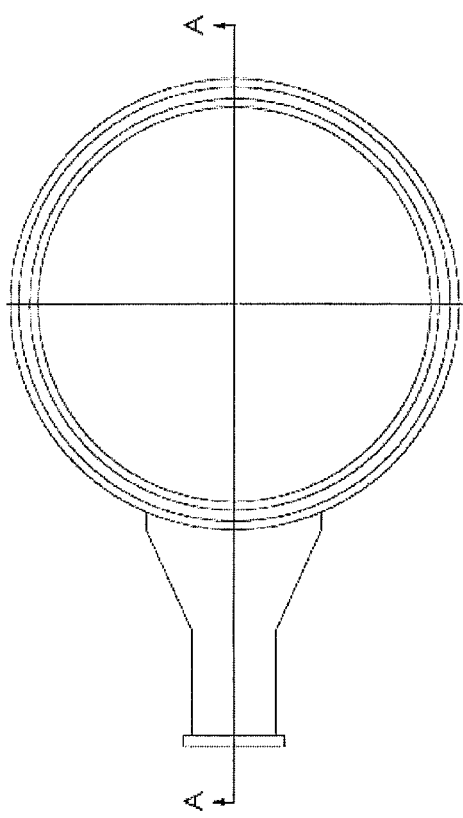
Figure 26C:
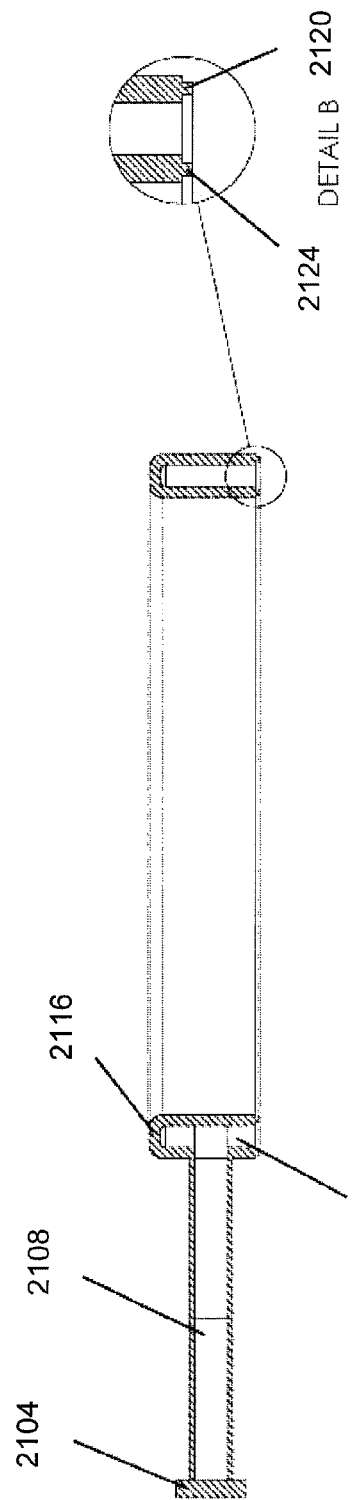

The detail of FIG. 26D shows the upper and lower sealing lips 2120 and 2124 used to seal the exhaust manifold with the rotary head.

FIGS. 27A-27C show side, isometric, and horizontal-plane longitudinal cross sectional views of an alternative manifold that may be used as an exhaust manifold for the dual-rotation engine described in connection with FIGS. 5A-5C or for the engine described in connection with FIGS. 6A-6C and 7A-7B, or that may be used as an exhaust or intake manifold for the engine described in connection with FIGS. 8A-8C.

The body 2216 includes an exhaust manifold collector ring 2212 for collecting gases after they have been discharged through an exhaust passage of the rotary head as appropriate for the embodiment. Flow through exhaust tube 2208 is controlled with a valve 2204, thereby adjusting exhaust gases directed to the turbine. The remainder of the exhaust gases are evacuated through an auxiliary exhaust tube 2224 directly to the atmosphere.

Similar to the previous embodiment, the valve 2204 may be used for braking of a vehicle that comprises the engine in combination with opening of a valve comprised by the combustion chamber by increasing exhaust pressure when the acceleration pedal is not pressed and the brake pedal is pressed. This process prepares the combustion chamber for when the acceleration pedal is next pressed by having air to burn the injected fuel and thereby start the cycle by rotating the air compressor to pump air into the combustion chamber.

The detail view of FIG. 27D illustrates the upper and lower sealing lips 2220 and 2228 used to seal the manifold with the rotary head.

Shaft

An illustration of a shaft that may be used in the embodiments of FIGS. 1A-1C to 4A-4B is illustrated with FIGS. 28A-28C, which provide isometric, front, and horizontal-plane longitudinal cross-sectional views. The shaft has a body 2316 with key slots 2304. Air from the air pump to the air accumulator may be supplied through a central bore 2312 of the shaft and through radial air-supply bores 2308. In the other embodiments, the shaft is similar, but without holes.

Seals and Bushings

Sliding bushings, which are used in various embodiments as described above, are illustrated in FIGS. 29A and 29B, which show front and longitudinal cross-sectional views. The bushing body 1520 has a conical bore 1522 at each end that is inclined at an angle y. The middle portion is cylindrical. This allows the motion of sliding rods of the plates to create a wedge action with oil, thereby increasing the oil pressure to enhance lubrication and reduce wear on the sliding rod and bushing.

FIGS. 30A and 30B and FIGS. 31A and 31B illustrate compact-seal assemblies used to seal the sliding rods of the plates. In the embodiment of FIGS. 30A and 30B, which provide front and transverse cross-sectional views, the sliding bushings 1721 are disposed within a sliding-bushing body 1720, with bores 1722 provided to allow oil to enter the bushing body 1720 and lubricate the bushings 1721. Plates 1723 move within the body 1720, with sealing being effected by a disk-like sealing spring 1725. In the alternative illustrate of FIGS. 31A and 31B, which also provide front and transverse cross-sectional views, rubber and steel disks 1726 act to provide the sealing. Each of these provides a strong seal to minimize leaks and withstand high pressures.

Figure 32A:
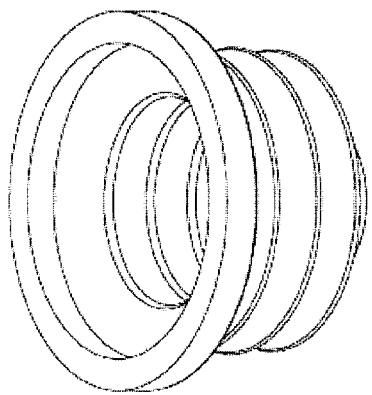
FIGS. 32A, 32B, and 32C respectively provide detail isometric, front, and vertical-plane longitudinal cross-sectional views of the compact-seal assembly of FIGS. 30A and 30B.
Figure 32C:
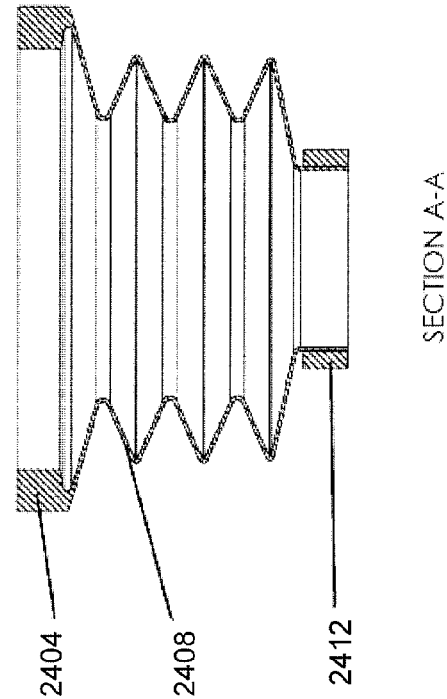
Figure 32B:
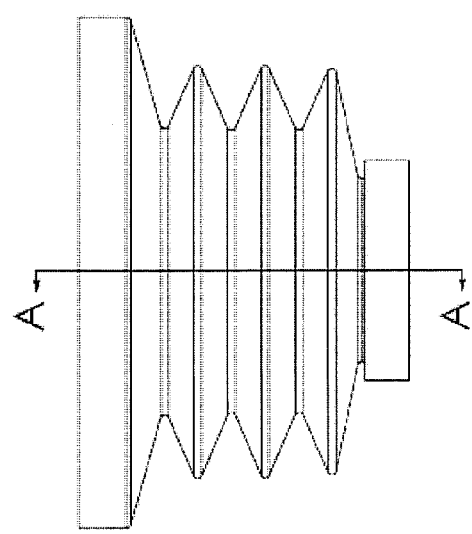

FIGS. 32A-32C provide a detail of the structure of the disk-like sealing spring 1725. An upper clamping ring 2404 is tight against the sliding bushing body 1720 and a bottom clamping ring 2412 is clamped on the slider rod of the plates. The spring body 2408 provides the necessary deformation to allow the plates to move.

FIGS. 33A-33C similarly provide a detail of the structure of the rubber and steel disks arrangement 1726. An upper metal ring 2504 is tight against the sliding bushing body 1720 and a lower metal ring 2516 has conical machining 2520 that comes in contact with a mating conical surface of the sliding rod of the plates, thereby providing the sealing. In between the metal rings are a plurality of rubber rings 2508 interdigitated between intermediate metal rings 2512. The rubber rings are made from a porous rubber to provide for deformation that allows the plates to move.

These structures are provided by way of example. As will be appreciated by those of skill in the art, still other sealing structures may be used in further alternative embodiments.

Drive System

Figure 34:
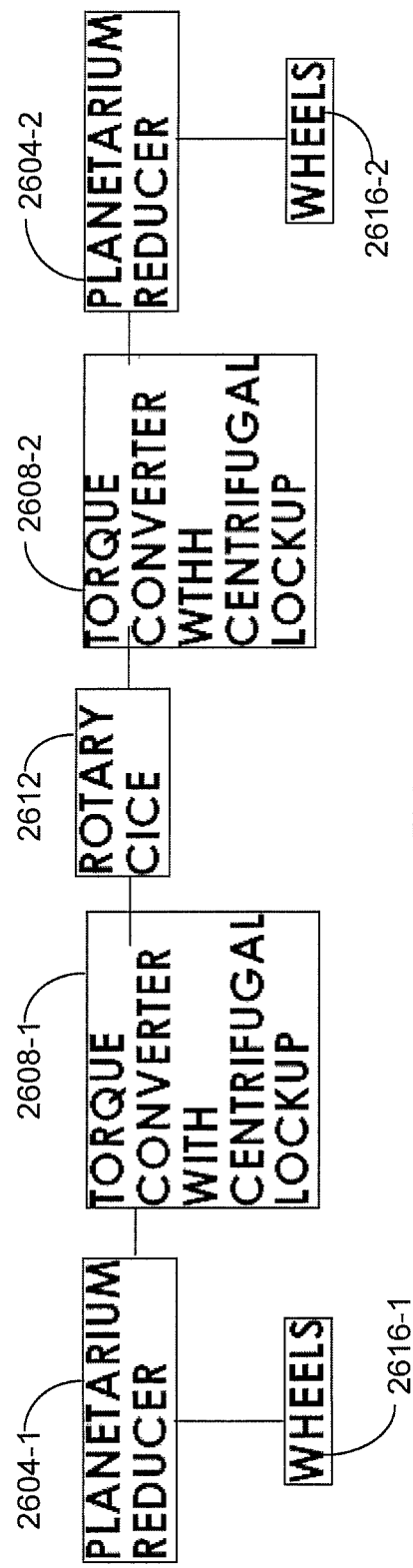
FIG. 34 provides a schematic representation of a vehicle drive system using an internal combustion engine described herein.
Figure 35:
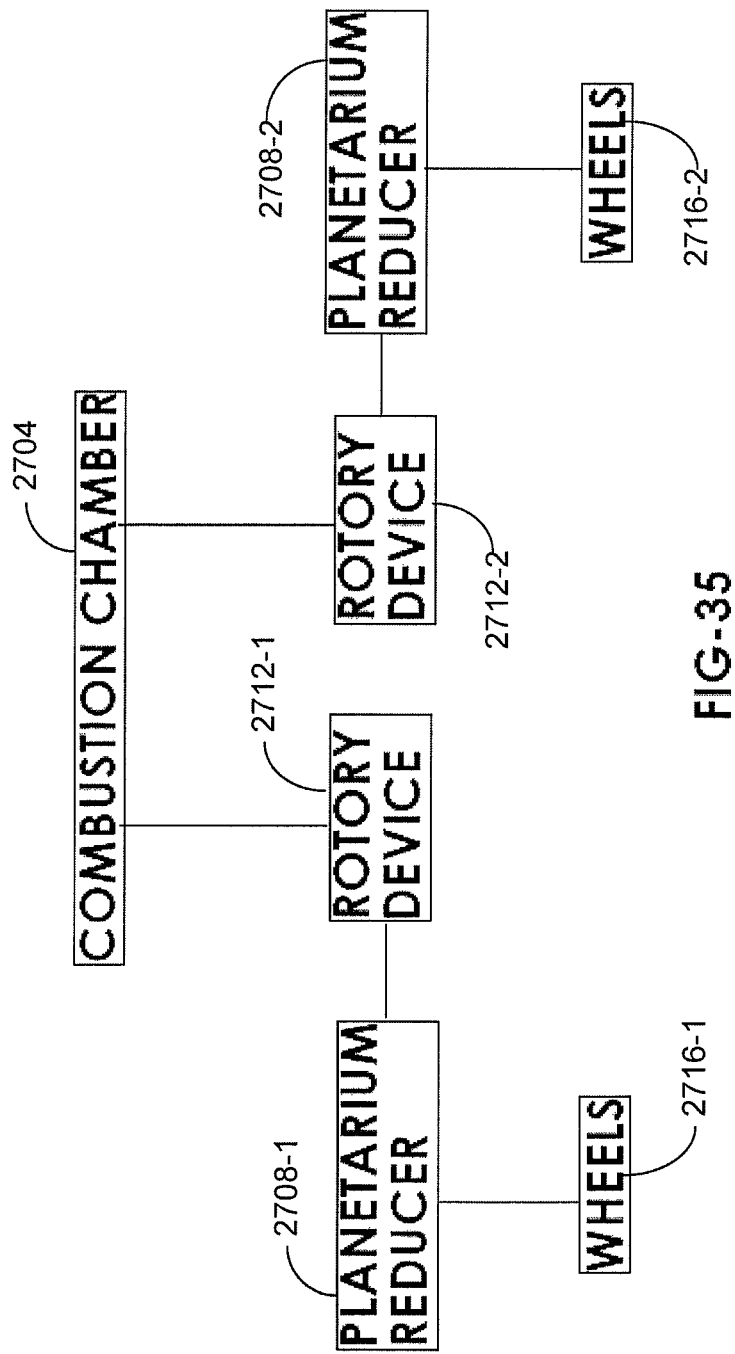
FIG. 35 provides a schematic representation of an alternative vehicle drive system using an internal combustion engine described herein.
Figure 36:
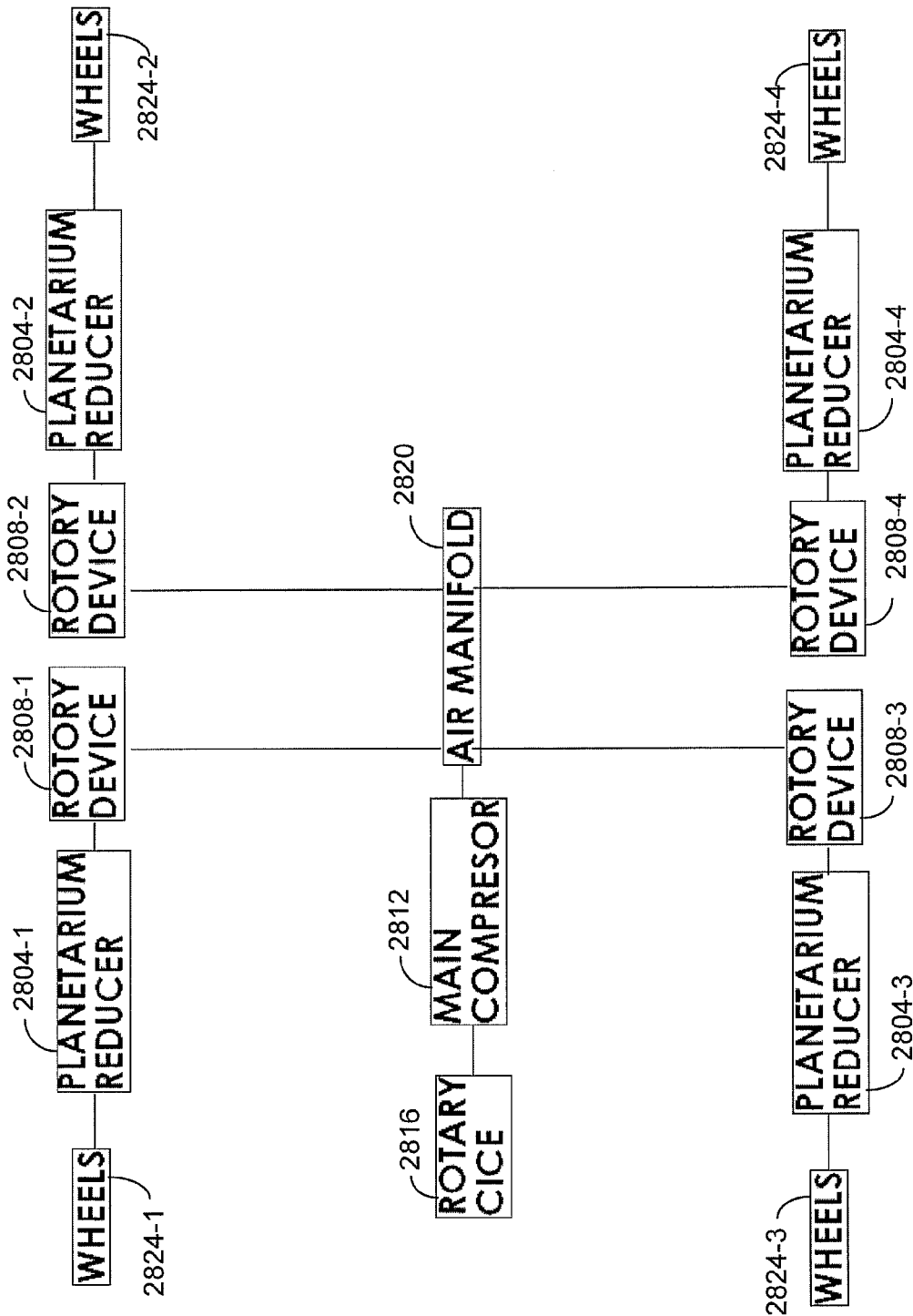
FIG. 36 provides a schematic representation of an alternative vehicle drive system using an internal combustion engine described herein.

FIGS. 34-36 provide examples of drive systems that may be configured for vehicles that comprise an internal combustion engine as described herein. The drawings are provided schematically to illustrate certain features.

FIG. 34 provides a representation of a vehicle drive system using a rotary continuous internal combustion engine 2612 as described herein; any of the engine structures described above may be used. Power is transmitted through torque converters 2608 and planetary reducers 2604 to the wheels 2616. The torque converters 2608 preferably include centrifugal lockup so that after a certain revolution speed, the torque is locked and there is no further power loss. In this way, transmitted torque is smooth and increased as necessary by the planetary reducers 2604. The torque can also be transmitted directly to the planetary reducers 2604 in alternative embodiments, or even directly to the wheels 2616.

In the alternative arrangement illustrated in FIG. 35, the same combustion chamber 2704 supplies a plurality of rotary devices 2712, with a stationary drum, to provide torque to the wheels 2716 through planetary reducers 2708. This arrangement allows the drive system to act as a differential when the vehicle takes a curve.

The further embodiment illustrated in FIG. 36 is appropriate for a four-wheel-drive vehicle. A main continuous internal combustion engine 2816 actuates a main compressor 2812 that supplies air to the main rotary continuous internal combustion engine 2816 and to an air manifold 2820 that supplies air to each of four rotary devices 2808, which provide torque to the wheels 2824 through planetary reducers 2804. This is a simple and efficient way to transmit power to all of the wheels, and acts similarly to a universal differential for the wheels.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A rotary device comprising:
  a rotary head having an expansion chamber defined in and extending along an inner side of a body of the rotary head between an intake slot in fluid communication with a source of combustion gas and an exhaust slot;
  a drum having a plurality of axial slots radially displaced over a circumference of the drum, an outer surface of the drum disposed in close noncontacting proximity to the inner side of the rotary head along substantially the entire outer surface of the drum, wherein the drum and the rotary head are substantially rotationally symmetric about a common axis, and wherein the rotary head is rotatable about the common axis;
  a plurality of radially moveable plates; and
  a mechanical control mechanism adapted to move each plate from a retracted position in which the each plate is located entirely within the outer surface of the drum and an extended position in which the each plate is in close proximity to an upper surface of the expansion chamber to substantially seal the expansion chamber,
  wherein at least one of the plates is substantially always present between the intake slot and the exhaust slot such that when the combustion gas is under pressure within the expansion chamber force is exerted on the at least one of the plates and the drum to produce rotational motion of the rotary head about the common axis.

2. The rotary device recited in claim 1 wherein the drum is free to independently rotate about the common axis, the force additionally producing a complimentary reactive force on the drum to produce rotational motion of the drum about the common axis in a direction opposite to the rotational motion of the rotary head such that the rotary head and drum each comprise working members operable to supply work.

3. The rotary device recited in claim 1 wherein the drum is held stationary relative to the common axis such that only the rotary head is rotatable about the common axis.

4. The rotary device recited in claim 1 wherein the rotary head and the drum are sealed with noncontacting labyrinthine seals.

5. The rotary device recited in claim 4 wherein the noncontacting labyrinthine seals comprise a plurality of grooves substantially perpendicular to an escape direction for the combustion gas under pressure.

6. The rotary device recited in claim 1 further comprising a closed track cam for positioning the plates, wherein the plates include sliders disposed for movement along the closed track cam.

7. The rotary device recited in claim 6 further comprising sliding bushings to receive the sliders, wherein the sliding bushings have a conically shaped surface at each end with a substantially cylindrical central portion.

8. The rotary device recited in claim 6 further comprising sliding bushings to receive the sliders, wherein:
  the sliders comprise slider boxes and a sliding rod; and
  oil is sealed in the slider boxes with compact seals, each such compact seal comprising a first collar tight on the sliding rod and a second collar tight on a bore of the sliding bushing with a flexible body therebetween that is deformable in response to movement of the sliding rod with respect to the bore of the sliding bushing.

9. The rotary device recited in claim 1 wherein the rotary device is adapted to be actuated by, or to actuate, a fluid, wherein the fluid is in liquid or gas form.

10. The rotary device recited in claim 1 wherein the expansion chamber comprises a plurality of expansion chambers substantially uniformly distributed about a circumference of the rotary head.

11. A continuous internal combustion engine comprising:
  a combustor in fluid communication with a supply of fuel and a supply of oxidizer;
  an ignition device adapted to ignite a mixture of the fuel and oxidizer within the combustor to produce a pressurized combustion gas;
  a rotary device disposed external to the combustor, the rotary device comprising:
    a rotary head having an expansion chamber defined in and extending along an inner side of a body of the rotary head between an intake slot in fluid communication with the combustor to receive the pressurized combustion gas and an exhaust slot;
    a drum having a plurality of axial slots radially displaced over a circumference of the drum, an outer surface of the drum disposed in close noncontacting proximity to the inner side of the rotary head along substantially the entire outer surface of the drum, wherein the drum and the rotary head are substantially rotationally symmetric about a common axis, and the rotary head is rotatable about the common axis;
    a plurality of radially moveable plates; and a mechanical control mechanism adapted to move each plate from a retracted position in which the each plate is located entirely within an outer surface of the drum and an extended position in which the each plate is in close proximity to an upper surface of the expansion chamber to substantially seal the expansion chamber, wherein at least one of the plates is substantially always present between the intake slot and the exhaust slot such that when the combustion gas is under pressure within the expansion chamber, force is exerted on the at least one of the plates and the drum to produce rotational motion of the rotary head about the common axis.

12. The continuous internal combustion engine recited in claim 11 wherein the drum is free to independently rotate about the common axis, the force additionally producing a complimentary reactive force on the drum to produce rotational motion of the drum about the common axis in a direction opposite to the rotational motion of the rotary head such that the rotary head and drum each comprise working members operable to supply work.

13. The continuous internal combustion engine recited in claim 11 wherein the drum is held stationary relative to the common axis such that only the rotary head is rotatable about the common axis.

14. The continuous internal combustion engine recited in claim 11 wherein the rotary head and the drum are sealed with noncontacting labyrinthine seals.

15. The continuous internal combustion engine recited in claim 14 wherein the noncontacting labyrinthine seals comprise a plurality of grooves substantially perpendicular to an escape direction for the combustion gas under pressure.

16. The continuous internal combustion engine recited in claim 11 further comprising a closed track cam for positioning the plates, wherein the plates include sliders disposed for movement along the closed track cam.

17. The continuous internal combustion engine recited in claim 16 further comprising sliding bushings to receive the sliders, wherein the sliding bushings have a conically shaped surface at each end with a substantially cylindrical central portion.

18. The continuous internal combustion engine recited in claim 11 wherein the combustor comprises:
   a combustor expansion chamber in fluid communication with the intake slot of the rotary-head expansion chamber;
   a burning chamber enveloped by the combustor expansion chamber, a wall of the burning chamber including calibrate orifices to provide fluid communication between the burning chamber and the combustor expansion chamber; and
   a mixing chamber enveloped by the burning chamber, a wall of the mixing chamber including calibrate orifices to provide fluid communication between the mixing chamber and the burning chamber.

19. The continuous internal combustion engine recited in claim 11 wherein the combustor is fixedly attached to the rotary head and rotates with the rotary head in response to the force.

20. The continuous internal combustion engine recited in claim 11 wherein the oxidizer in the combustion chamber comprises compressed air.

21. The continuous internal combustion engine recited in claim 20 further comprising an air pump in fluid communication with the combustor and adapted to pump air into the combustor.

22. The continuous internal combustion engine recited in claim 21 further comprising an air accumulator in fluid communication with the combustor and in fluid communication with the air pump, wherein the air pump is adapted to pump air into the combustor via the air accumulator.

23. The continuous internal combustion engine recited in claim 21 wherein the air pump comprises an auxiliary rotary device that is actuated by exhausting of the combustion gas from the exhaust slot, wherein the auxiliary rotary device comprises a distribution valve disposed between the exhaust port of the rotary device and the auxiliary rotary device to control the flow of exhaust gas between the auxiliary rotary device and to the atmosphere to control the amount of air supplied from the air pump to the combustion chamber.

24. The continuous internal combustion engine recited in claim 21 further comprising a turbine, wherein the air pump is actuated by the turbine in response to actuation of the turbine by exhausting of the combustion gas from the exhaust slot.

25. The continuous internal combustion engine recited in claim 21 further comprising an auxiliary rotary device, wherein the air pump is actuated by the auxiliary rotary device in response to actuation of the auxiliary rotary device by the combustion gas directly from the combustion chamber.

26. The continuous internal combustion engine recited in claim 11 wherein the expansion chamber comprises a plurality of expansion chambers substantially uniformly distributed about a circumference of the rotary head.

27. The continuous internal combustion engine recited in claim 25, further comprising:
   a distribution valve disposed between the combustion chamber, the rotary device, and the auxiliary rotary device, wherein the distribution valve is operable to control the flow of combustion gases between the rotary device and the auxiliary rotary device to control the amount of air supplied to the combustion chamber.

* * * * *

UNITED STATES PATENT AND TRADEMARK OFFICE
CERTIFICATE OF CORRECTION

PATENT NO. : 8,464,685 B2
APPLICATION NO. : 12/896528
DATED : June 18, 2013
INVENTOR(S) : Ionel Mihailescu It is certified that error appears in the above-identified patent and that said Letters Patent is hereby corrected as shown below:

In the Specifications:

Column 10, line 11, delete "spanker" and insert therefor --sparker--
Column 14, line 36, delete "wails" and insert therefor --walls--

Signed and Sealed this
Thirteenth Day of August, 2013

Teresa Stanek Rea
*Acting Director of the United States Patent and Trademark Office*